United States Patent
Wakabayashi et al.

(10) Patent No.: US 11,419,150 B2
(45) Date of Patent: Aug. 16, 2022

(54) TERMINAL DEVICE INFRASTRUCTURE EQUIPMENT AND METHODS FOR DETERMINING A SPATIAL POSITION OF THE TERMINAL BASED ON RECEIVED SIGNALS

(71) Applicants: Sony Corporation, Tokyo (JP); Sony Mobile Communications Inc., Tokyo (JP)

(72) Inventors: Hideji Wakabayashi, Basingstoke (GB); Anders Berggren, Basingstoke (GB); Yuxin Wei, Basingstoke (GB); Vivek Sharma, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 58 days.

(21) Appl. No.: 16/760,043

(22) PCT Filed: Oct. 24, 2018

(86) PCT No.: PCT/EP2018/079162
§ 371 (c)(1),
(2) Date: Apr. 29, 2020

(87) PCT Pub. No.: WO2019/086309
PCT Pub. Date: May 9, 2019

(65) Prior Publication Data
US 2021/0212124 A1   Jul. 8, 2021

(30) Foreign Application Priority Data

Oct. 30, 2017 (EP) .................................... 17199204

(51) Int. Cl.
*H04W 74/08* (2009.01)
*G01S 19/06* (2010.01)
(Continued)

(52) U.S. Cl.
CPC ......... *H04W 74/0833* (2013.01); *G01S 19/06* (2013.01); *G01S 19/252* (2013.01); *H04W 64/00* (2013.01)

(58) Field of Classification Search
CPC . H04W 74/08; H04W 64/00; H04W 74/0833; H04W 4/02; H04W 4/021;
(Continued)

(56) References Cited

U.S. PATENT DOCUMENTS

| 8,730,100 B2 | 5/2014 | Ische et al. |
| 2005/0020282 A1* | 1/2005 | Pande et al. ............... 455/456.1 |

(Continued)

FOREIGN PATENT DOCUMENTS

WO   2018/015540 A1   1/2018

OTHER PUBLICATIONS

International Search Report and Written Opinion dated Feb. 19, 2019 for PCT/EP2018/079162 filed on Oct. 24, 2018, 12 pages.
(Continued)

*Primary Examiner* — Meless N Zewdu
(74) *Attorney, Agent, or Firm* — Xsensus LLP

(57) ABSTRACT

A terminal device for use in a wireless telecommunications network, the terminal device comprising: first receiver circuitry configured to receive a first signal from each of one or more signal emitting devices located at respective spatial positions; transmitter circuitry configured to transmit a second signal to infrastructure equipment of the wireless telecommunications network; second receiver circuitry configured to receive a third signal from the infrastructure equipment, the third signal being transmitted by the infra-
(Continued)

structure equipment in response to the infrastructure equipment receiving the second signal, the third signal being for determining, in combination with the first signal received from each of the one or more signal emitting devices, the spatial position of the terminal device, and the third signal being comprised within a predetermined system information block (SIB); and control circuitry configured to determine a spatial position of the terminal device based on the received first and third signals.

15 Claims, 9 Drawing Sheets

(51) Int. Cl.
  *G01S 19/25* (2010.01)
  *H04W 64/00* (2009.01)
(58) Field of Classification Search
  CPC ..... H04W 4/029; H04W 48/04; H04W 48/10;
    H04W 48/12; H04W 48/48; H04W 88/00;
    H04W 88/02; H04W 88/08; H04W 4/024;
    H04W 84/06; H04W 40/00; H04W 40/20;
    H04W 4/025; G01S 19/06; G01S 19/05;
    G01S 19/25; G01S 19/252; G01S
    19/0236; G01S 19/42; G01S 19/46; G01S
    5/02; G01S 5/14; G01S 19/00; G01S
    1/00; G01S 1/045; G01S 19/48; G01S
    2205/00; G01S 5/0236; G01S 5/0009;
    G01S 5/0036; G01S 5/0018; G01S
    5/0027; G01S 19/07; H04N 21/422;
    H04N 2201/3253; H04L 9/0872; H04L
    29/00; H04B 7/18556; H04B 7/18554;
    H04B 7/185; H04B 7/18508; H04B
    7/1851; H04B 7/18521; H04B 7/18513;
    H04B 7/18517; H04B 7/18526; H04B
    7/18528; H04B 7/1853
  See application file for complete search history.

(56) References Cited

U.S. PATENT DOCUMENTS

| | | | |
|---|---|---|---|
| 2008/0310363 A1* | 12/2008 | McBeath et al. | 370/330 |
| 2009/0149208 A1* | 6/2009 | Huttunen et al. | 455/509 |
| 2009/0175161 A1* | 7/2009 | Yi et al. | 370/210 |
| 2010/0013702 A1* | 1/2010 | Lin et al. | 342/357.02 |
| 2011/0057836 A1 | 3/2011 | Ische et al. | |
| 2014/0232601 A1* | 8/2014 | Ische et al. | G01S 5/0009 |
| 2014/0278077 A1 | 9/2014 | Levin et al. | |
| 2014/0301304 A1* | 10/2014 | Kubota et al. | H04W 74/0833 |
| 2016/0057727 A1* | 2/2016 | Nyman et al. | H04W 64/00 |
| 2017/0180925 A1* | 6/2017 | Taylor et al. | H04W 4/02 |
| 2017/0231021 A1 | 8/2017 | Tavildar et al. | |
| 2018/0103404 A1* | 4/2018 | Emmanuel et al. | H04W 36/20 |
| 2018/0115305 A1* | 4/2018 | Islam et al. | H03J 5/242 |
| 2018/0220361 A1* | 8/2018 | Cheng et al. | H04W 48/10 |
| 2018/0313929 A1* | 11/2018 | Bitra et al. | G01S 5/0252 |
| 2018/0324740 A1* | 11/2018 | Edge et al. | H04W 64/00 |
| 2019/0037604 A1* | 1/2019 | Akkarakara et al. | H04W 74/0833 |
| 2020/0015265 A1* | 1/2020 | Zhang et al. | H04W 74/006 |

OTHER PUBLICATIONS

3GPP, "LTE; Evolved Universal Terrestrial Radio Access Network (E-UTRAN); Stage 2 functional specification of User Equipment (UE) positioning in E-UTRAN," ETSI 3rd Generation Partnership Project, Technical Specification 36.305, version 13.0.0, Release 13, Jan. 2016, pp. 1-70.

3GPP, "LTE; Evolved Universal Terrestrial Radio Access Network (E-UTRA); Radio Resource Control (RRC); Protocol specification," ETSI 3rd Generation Partnership Project, Technical Specification 36.331, version 11.15.0, Release 11, Apr. 2016, pp. 1-473.

3GPP, "LTE; Evolved Universal Terrestrial Radio Access Network (E-UTRA); LTE Positioning Protocol (LLP)," ETSI 3rd Generation Partnership Project, Technical Specification 36.355, version 13.3.0, Release 13, Feb. 2017, pp. 1-142.

Thorpe, M. and Zelmer, E., "LTE Location Based Services Technology Introduction," White paper, Rohde & Schwarz LTE Location Based Services, Sep. 2013, 23 pages.

"MADOCA Real-Time Products," QZSS : Quazi-Zenith Satellite System, Jun. 13, 2019, 1 page.

Li, B., et al., "Secure User Plane Location (SUPL): concept and performance," ResearchGate, Mar. 2010, 24 pages.

Samsung, "On Demand SI: Remaining Issues," 3GPP TSG-RAN WG2 NR#2, R2-1706527, Qingdao, China, Jun. 27-29, 2017, 8 pages.

LG Electronics Inc., "RAN paging DRX in RRC_INACTIVE," 3GPP TSG-RAN WG2 #99, R2-1708464, Revision of R2-1705651/R2-1707183, Berlin, Germany, Aug. 21-25, 2017, pp. 1-2.

Ericsson, "Size of MSG3 in NR," 3GPP TSG-RAN WG2 #99bis, Tdoc R2-1710199, Prague, Czech Republic, Oct. 9-13, 2017, pp. 1-4.

CMCC, "The positioning assistance data broadcasting," 3GPP TSG-RAN WG2 Meeting #99bis, R2-1711154, resubmission of R2-1708994, Oct. 9-13, 2017, 4 pages.

3GPP, "Universal Mobile Telecommunications System (UMTS); Evolved Universal Terrestrial Radio Access (E-UTRA) and Evolved Universal Terrestrial Radio Access Network (E-UTRAN)," Overall description; Stage 2, Technical Specification 36.300, version 8.5.0, Release 8, Jul. 2008, pp. 1-137.

Reil, A., "Receiving BEIDOU, GALILEO and GPS signals with MATLAB® and R&S® IQR, R&S® TSMW," Rohde & Schwarz, Application Note BEIDOU SW Receiver Matlab—1MA203_0e, May 19, 2014, pp. 1-27.

3GPP, "Digital cellular telecommunications system (Phase 2+); Universal Mobile Telecommunications System (UMTS); LTE," ETSI 3rd Generation Partnership Project, Technical Specification 23.271, version 10.4.0, Release 10, Apr. 2013, pp. 1-170.

3GPP, "LTE; Evolved Universal Terrestrial Radio Access Network (E-UTRAN); Stage 2 functional specification of User Equipment (UE) positioning in E-UTRAN," ETSI 3rd Generation Partnership Project, Technical Specification 36.305, version 10.0.0, Release 10, Jan. 2011, pp. 1-52.

"GNSS Market Report," European Global Navigation Satellite Systems Agency, Issue 5, 2017, 100 pages.

* cited by examiner

TERMINAL DEVICE INFRASTRUCTURE EQUIPMENT AND METHODS FOR DETERMINING A SPATIAL POSITION OF THE TERMINAL BASED ON RECEIVED SIGNALS

CROSS-REFERENCE TO RELATED APPLICATIONS

The present application is based on PCT filing PCT/EP2018/079162, filed Oct. 24, 2018, which claims priority to EP 17199204.3, filed Oct. 30, 2017, the entire contents of each are incorporated herein by reference.

BACKGROUND

Field of the Disclosure

The present invention relates to a terminal device, infrastructure equipment and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance. Low complexity devices are also often low power devices, in which it is desirable for such devices to have a low power consumption (and therefore a long battery life).

Future wireless communications networks will be expected to routinely and efficiently support location based services with a wider range of devices/applications than current systems are optimised to support.

For example, it is expected that wireless communications in 5G will support geo-fencing services such as child location services, mobile coupons/advertisements which are triggered near a shop and airport automatic check-in at the gate/counter. These applications require continuous tracking of UE position or monitoring the equivalent trigger conditions with low UE power consumption.

In view of this there is expected to be a desire for future wireless communications networks, for example those which may be referred to as 5G ($5^{th}$ Generation) or new radio (NR) system/new radio access technology (RAT) systems, as well as future iterations/releases of existing systems, to efficiently support connectivity for a wide range of devices. In particular, the problem of how to efficiently transmit signals to and receive signals from low complexity devices whilst keeping the power consumption of such devices low needs to be addressed.

SUMMARY

The present technique is defined according to the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
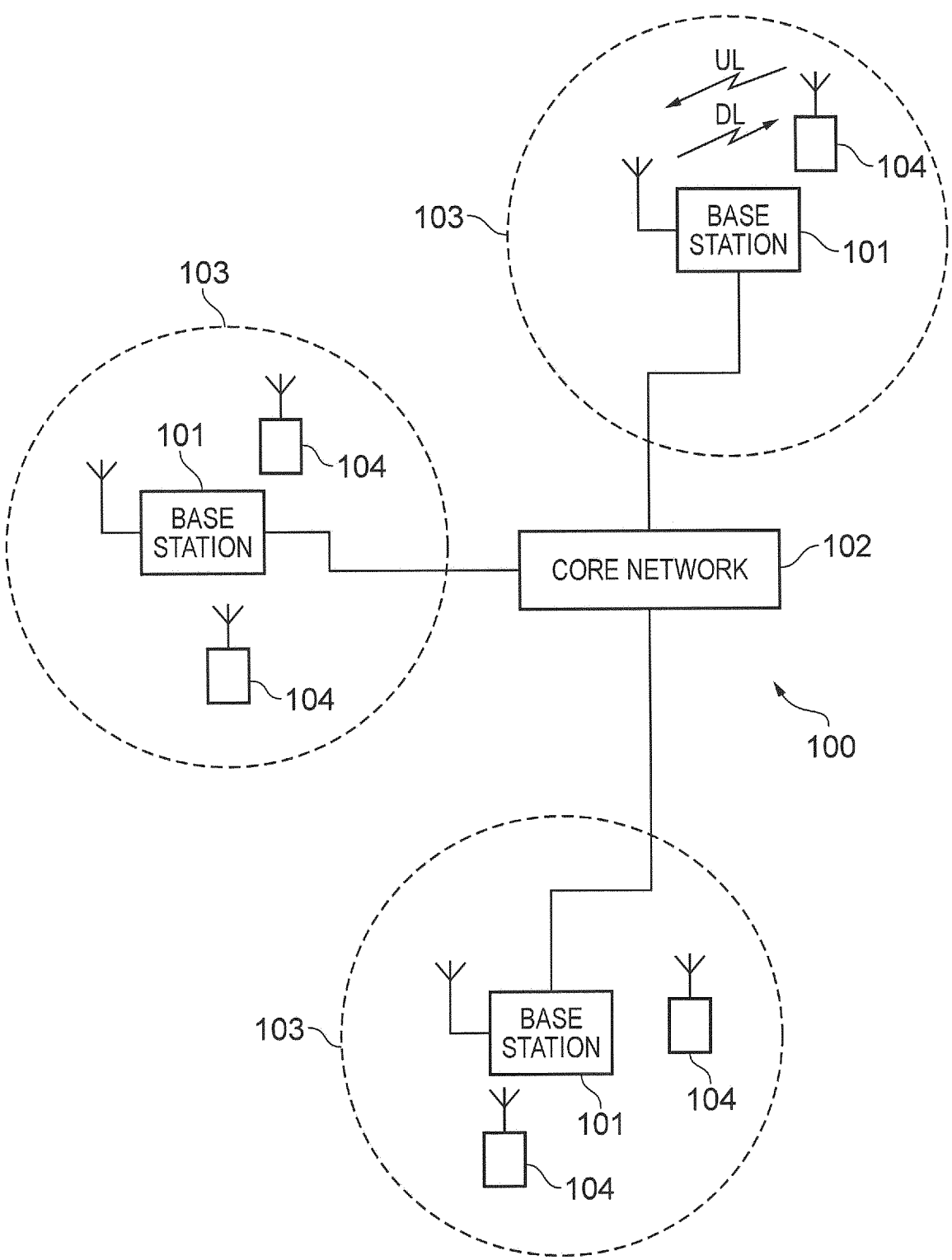
FIG. 1 provides a schematic diagram illustrating some basic functionality of a mobile telecommunications network.

Referring now to the drawings, wherein like reference numerals designate identical or corresponding parts throughout the several views.

FIG. 1 provides a schematic diagram illustrating some basic functionality of a mobile telecommunications network/system operating in accordance with LTE principles and which may be adapted to implement embodiments of the disclosure as described further below. It will be appreciated, however, that the use of LTE is only an example, and that the principles of the present disclosure may be applied to other types of wireless communications systems such as UMTS or NR (5G). Various elements of FIG. 1 and their respective modes of operation are well-known and defined in the relevant standards administered by the 3GPP(®) body, for example, 3GPP TS36 series [1] for LTE and 3GPP TS38 series for NR [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device, terminal and so forth. A base stations may also be referred to as a transceiver station, infrastructure equipment, NodeB (which is a UMTS base station), eNodeB (which is a LTE base station (eNB for short)), gNodeB (which is a NR base station (gNB for short)), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
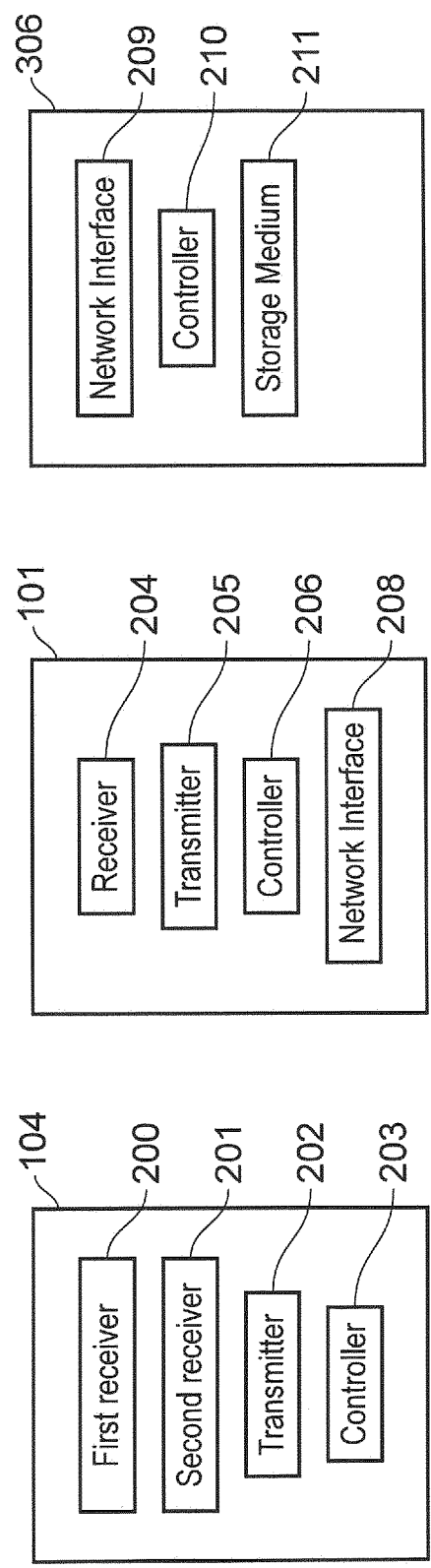
FIG. 2 schematically shows some components of a terminal device and a base station according to an example embodiment.

FIG. 2 schematically shows some components of a UE 104, a base station 101 and a data processing apparatus 306 (e.g. a location server) according to an example embodiment.

The UE 104 comprises a first receiver 200, a second receiver 201, a transmitter 202 and a controller 203. The first receiver 200 is for receiving wireless signals from each of one or more signal emitting devices located at respective spatial locations. Such signal emitting devices may be GNSS (Global Navigation Satellite System) satellites, for example. The second receiver 201 is for reception of wireless signals (e.g. radio signals). The transmitter 202 is for transmission of wireless signals (e.g. radio signals). The controller 203 is configured to control the first receiver 200, second receiver 201 and transmitter 202 and to control the UE 104 to operate in accordance with embodiments of the present disclosure. The controller 203 may comprise various sub-units for providing functionality in accordance with embodiments of the present disclosure as explained further below. These sub-units may be implemented as discrete hardware elements or as appropriately configured functions of the controller 203. The controller 203 may be suitably configured/programmed to provide the desired functionality described herein using conventional programming/configuration techniques for equipment in telecommunications systems. The first receiver 200, second receiver 201, transmitter 200 and controller 201 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the first receiver 200, second receiver 201, transmitter 202 and controller 203 are implemented as circuitry.

The base station 101 comprises a transmitter 205, a receiver 204, a network interface 208 and a controller 206. The transmitter 205 is for transmission of wireless signals (e.g. radio signals), the receiver 204 is for reception of wireless signals (e.g. radio signals), a network interface 208 for transmission and reception of signals (e.g. to and from a location server, as explained below) over a network such as the internet and the controller 206 is configured to control the transmitter 205, receiver 204 and network interface 208 and to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may be suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 204, network interface 208 and controller 206 are implemented as circuitry.

The data processing apparatus 306 comprises a network interface 209, a storage medium 211 and a controller 210. The network interface 209 is for transmission and reception of signals (e.g. to and from infrastructure equipment, as explained below) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure The controller 210 may comprise various sub-units for providing functionality in accordance with embodiments of the present disclosure as explained further below. These sub-units may be implemented as discrete hardware elements or as appropriately configured functions of the controller 210. The controller 210 may be suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the data processing apparatus 306 will in general comprise various other elements associated with its operating functionality. In the following embodiments, the network interface 209 and controller 210 are implemented as circuitry.

In the UE 104, the first receiver 200 is configured to receive a first signal from each of one or more signal emitting devices located at respective spatial positions. The transmitter 202 is configured to transmit a second signal to infrastructure equipment (such as the base station 101) of the wireless telecommunications network. The second receiver 201 is configured to receive a third signal from the infrastructure equipment, the third signal being transmitted by the infrastructure equipment in response to the infrastructure equipment receiving the second signal, the third signal indicating the respective spatial positions of each of the one or more signal emitting devices, and the third signal being comprised within a predetermined system information block (SIB). The controller 203 is configured to determine a spatial position of the terminal device based on the received first and third signals.

In the base station 101, the receiver 204 is configured to receive a second signal from a terminal device (such as the UE 104) of the wireless telecommunications network, the second signal being transmitted by the terminal device in response to the terminal device receiving a first signal from each of one or more signal emitting devices located at respective spatial positions. The controller 206 is configured, in response to the reception of the second signal, to determine the respective spatial positions of each of the one or more signal emitting devices. The transmitter 205 is configured to transmit a third signal to the terminal device, the third signal indicating the respective spatial positions of each of the one or more signal emitting devices and the third signal being comprised within a predetermined system information block (SIB).

In an embodiment, the controller 203 of the UE 104 is configured to determine the spatial position of the terminal device with respect to each of the one or more signal emitting devices based on a measurement of a characteristic (e.g. signal strength and/or quality) of the first signal transmitted by each of the one or more signal emitting devices. The third signal indicates the respective spatial position of each of the one or more signal emitting devices. The controller 203 is then able to calculate the absolute position of the UE 104 in a given coordinate system based on the determined spatial position of the terminal device with respect to each of the one or more signal emitting devices and the respective spatial position of each of the one or more signal emitting devices (such calculation techniques are known in the art and will therefore not be discussed here).

In embodiments of the present technique, the base station 101 (e.g. an LTE base station (eNodeB) or NR base station (gNodeB)) transmits assistance information of positioning (comprised within the above-mentioned third signal) via on-demand system information (the on-demand system information being provided via the above-mentioned predetermined SIB). The UE 104 can receive the assistance information in idle mode or in-active mode (although note that a connected mode UE can also receive the assistance information in this way). In order to support on-demand system information (SI), in an embodiment, UE capability indication/bitmap/implicit signaling is transmitted (as part of the above-mentioned first signal) in a random access procedure (e.g. Msg1 or Msg3 in the Random Access Channel (RACH) procedure) for requesting an on-demand SI. The UE 104 can thus avoid transitioning to connected mode to receive the assistance information, thus providing UE power saving. Such an arrangement is particularly suitable for low complexity devices used in, for example, MTC/IoT applications.

Compared to existing solutions for positioning (such as those proposed by 3GPP) it is desirable to provide improved positioning arrangements. The term "positioning" should be understood to refer to any process by which a UE determines its position in space (in particular, its geographical position). The desired improvements include:
- Variety of supported positioning methods/sensors
  - Multiple GNSS satellites support
  - Multiple indoor positioning sensors support
- Higher position accuracy required
  - Use high accuracy positioning with combination of GNSS (e.g. GLONASS (Globalnaya Navigazionnaya Sputnikovaya Sistema), Galileo, QZSS (Quasi-Zenith Satellite System))
  - Hybrid operation with multiple sensors
  - Outdoor/indoor seamless operation
- Low power consumption
  - Idle mode/inactive mode positioning/measurement
  - No connected mode for getting assistance information
- Large volume of positioning assistance information
  - The number of supported GNSS is increased.
  - To support network RTK (Real Time Kinematic), Precise Point Positioning (PPP)-RTK.
- NR PHY (Physical)/Protocol new functions
  - Introduction of on-demand system information (SI)
  - Inactive mode operation in addition to idle mode, connected mode The described embodiments relate primarily to 5G (NR) positioning enhancements. However, it will be appreciate that the teachings provided may be applicable for LTE systems (e.g. LTE systems which support on-demand SI or similar, as may be available in the near future). The present technique may provide at least some of the above-mentioned improvements for both suitable LTE and NR systems.

An example of on-demand SI which may be used with embodiments of the present technique may be found in European patent application EP 16180858.9, for example.

Furthermore, information regarding existing 3GPP location based service and protocols may be found in the following white paper: LTE Location Based Services Technology Introduction (Rohde & Schwarz) http://www.rohde-schwarz-wireless.com/documents/LTELBSWhitePaper_RohdeSchwarz.pdf.

Supported versions of UE positioning methods in LPP are disclosed in 3GPP TS36.305, for example. Some information from this publication is shown in Table 1.

TABLE 1

| Method | UE-based | UE-assisted, E-SMLC-based | eNB-assisted | LMU-assisted/ E-SMLC-based | SUPL |
|---|---|---|---|---|---|
| A-GNSS | Yes | Yes | No | No | Yes (UE-based and |

TABLE 1-continued

| Method | UE-based | UE-assisted, E-SMLC-based | eNB-assisted | LMU-assisted/ E-SMLC-based | SUPL |
|---|---|---|---|---|---|
| Downlink | No | Yes | No | No | UE-assisted) Yes (UE-assisted) |
| E-CID (Enhanced Cell ID) | No | Yes | Yes | No | Yes (UE-assisted) |
| Uplink | No | No | No | Yes | No |
| Barometric | No | Yes | No | No | No |
| WLAN (Wireless Local Area Network) | No | Yes | No | No | Yes |
| Bluetooth | No | Yes | No | No | No |
| TBS (Terrestrial Beacon System) | No | Yes | No | No | No |

In 3GPP, when a UE determines its spatial position, the measurement of signals (from GNSS satellites or the like) and the calculation of the UEs position based on those signals are distinguished. "UE-assistance positioning" refers to a situation in which a device external to the UE (such as a location server of a network to which the UE is connected) calculates the position of the UE according to the report of measurement results from the UE. The present technique, on the other hand, allows more "UE-based positioning", in which the UE is provided with sufficient information to calculate its position. In other words (as described in 3GPP TS 36.305 V13.0.0 (2015-12)), the suffixes "-based" and "-assisted" refer respectively to the node that is responsible for making the positioning calculation (and which may also provide measurements) and a node that provides measurements (but which does not make the positioning calculation). Thus, an operation in which measurements are provided by the UE to the E-SMLC (Evolved Serving Mobile Location Centre) to be used in the computation of a position estimate is described as "UE-assisted" (and could also be called "E-SMLC-based"), while one in which the UE computes its own position is described as "UE-based". UE-based positioning (as used with the present technique) requires less communication with the network compared to UE-assistance positioning, thus reducing the power consumption at the UE.

An example conventional UE-assistance positioning procedure (in particular, a typical LPP procedure) comprises the following steps:
1. UE sends the UE capability which indicates the supported positioning methods (for example, types of GNSS supported by the UE) to a location server (for example, a Secure User Plane Location (SUPL) server via SLP (SUPL Location Platform) or E-SMLC) in connected mode
2. Positioning assistance information is sent from the location server to the UE in connected mode
3. UE starts the measurements (e.g. by activating a Global Positioning System (GPS) receiver at the UE)
4. UE reports the result (e.g. GPS code phase measurements) to a location server in connected mode.
5. Location server estimates the UE current position.
6. UE obtains the estimated position from the location server (and/or the estimated position is used by the network for a suitable purpose)

It is noted that steps 1, 2 and 3 are still carried out even if UE-based positioning is used.

With the conventional method, the location server knows the UE positioning capability in advance. Furthermore, the network can provide a large volume of position assistance information to UE because it is able to use a connected mode communication bearer rather than, for example, relying on broadcast system information to provide the assistance information. However, the fact that the UE must enter connected mode in order for the UE positioning to be carried out means increased power consumption at the UE.

As previously mentioned, UE positioning may be carried out based on signals received from GNSS satellites. As discussed in https://www.gsa.europa.eu/system/files/reports/gnss_mr_2017.pdf, for example, Global Navigation Satellite System (GNSS) is the infrastructure that allows users with a compatible device (in this case, UE) to determine their position, velocity and time by processing signals from satellites. GNSS signals are provided by a variety of satellite positioning systems, including global and regional constellations and Satellite-Based Augmentation Systems:

Global constellations: Global Positioning System (GPS) (USA), Globalnaya Navigazionnaya Sputnikovaya Sistema (GLONASS) (Russian Federation), Galileo (EU), BeiDou (PRC).

Regional constellations: Quasi-Zenith Satellite System (QZSS) (Japan), Indian Regional Navigation Satellite System (IRNSS) (India), and BeiDou regional component (PRC).

Satellite-Based Augmentation Systems (SBAS): Wide Area Augmentation System (WAAS) (USA), European Geostationary Navigation Overlay Service (EGNOS) (EU), MTSAT Satellite Augmentation System (MSAS) (Japan), GPS Aided GEO Augmented Navigation (GAGAN) (India), System for Differential Corrections and Monitoring (SDCM) (Russian Federation) and Satellite Navigation Augmentation System (SNAS) (PRC).

A GNSS may have more than one band or code/signals. For example, GPS newly supports L2C signal (band L2, civilian GPS signal) in addition to conventional L1 C/A (band L1 and coarse/acquisition code). However, most of GPS terminals still support only L1 C/A.

GNSS assistance information via cellar network provides benefits for positioning. In particular, it allows some of the information required for the UE's position to be determined via GNSS to be provided to the UE via the network rather than directly from a satellite. In an embodiment of the present technique, GNSS assistance information may be transmitted as part of the third signal transmitted from the transmitter 205 of the base station 101 and received by the second receiver 202 of the UE 104. Other GNSS information is received directly from a satellite as part of the first signal by the first receiver 200 of the UE 104.

GNSS satellites transmit two type of signals, the codes and messages. The code is orthogonal code such as pseudorandom noise or the like. The messages includes the satellite orbit information such as Ephemeris and Almanac (which are needed for position estimation). Information regarding the Ephemeris and Almanac is provided in 3GPP TS 36.305 V13.0.0 (2015-12), for example. Here, it is defined that Ephemeris and Clock Models assistance provides the GNSS receiver (in this case, the UE) with parameters to calculate the GNSS satellite position and clock offsets. The various GNSSs use different model parameters and formats, and all parameter formats as defined by the individual GNSSs are supported by the signaling. It is also defined that Almanac assistance provides the GNSS receiver with parameters to calculate the coarse (long-term) GNSS satellite position and clock offsets. The various GNSSs use different model parameters and formats, and all parameter formats as defined by the individual GNSSs are supported by the signaling.

LPP supports the communication of a portion of the GNSS information (e.g. the messages) from a location server to a UE via an LTE base station as a faster complement to the transmission of this information from GNSS satellites.

Assistance information for positioning from the cellular network (that is, from a base station of the network) helps alleviate various problems associated with GNSS positioning, including those relating to the sensitivity of messages transmitted by GNSS satellites, the time to first fix and the provision of precise positioning.

In particular, the use of a cellular network helps alleviate satellite signal strength issues. A GNSS satellite signal is very weak due to the long distance between the UE and the satellites. The UE may also miss the signal due to having a relatively small GNSS antenna. It is noted that GNSS codes (in particular, GPS codes) require a lower signal to noise ratio (SNR) than GNSS messages (in particular, GPS messages). Thus, a situation may arise in which a UE can receive the GNSS codes, but cannot receive the GNSS messages. Furthermore, even if a UE can receive the message with high SNR, measurement time, which is called the time to first fix (TTFF), may be an issue. For example, GPS transmits the messages with very low bit rate (e.g. 50 bits/second). If a UE is to receive all necessary messages from a scratch (both Almanac and Ephemeris), this will take 12.5 minutes. By contrast, the cellular network provides a much higher bitrate and the UE is able to receive all necessary messages over a time period of the order of seconds.

The volume of GNSS assistance information is expected to be increased in the near future because of envisaged requirements for more accurate positioning. For example, JAXA (Japan Aerospace Exploration Agency) provides MADOCA (Multi-GNSS Advanced Demonstration tool for Orbit and Clock Analysis) for QZSS users, which needs precise point position (PPP). The assistance information from MADOCA is not only included in QZSS orbit and clock information, but is also used in other GNSS systems. However, the capacity of QZSS satellite communication (L-band) is limited. Highly common information which many users need may therefore be transmitted from the satellite. However, the remaining assistance information could be transmitted via other communication methods like (such as via the internet—for example, see https://ssl.tksc.jaxa.jp/madoca/public/public_index_en.html).

The described embodiments primarily relate to handling GNSS assistance information. However, the present technique may also be applied to positioning using other types of signal emitting devices which emit signals detectable by the UE. Such alternative positioning may be used in indoor public spaces (such as shopping centres, art galleries, museums and the like) in which it is not possible to obtain a satellite signal of sufficient strength and/or quality. In this case, information indicative of the position of one or more signal emitting devices is used in conjunction with a UE's distance from each signal emitting device (as measured based on a first signal from each signal emitting device by the first receiver 200 of the UE 104, for example) in order to determine the UE's position within the building. In this case, assistance information (indicative of the position of each of the one or more indoor signal emitting devices) could be transmitted to a UE via the network. More generally, the present technique may be implemented using one or more satellite or non-satellite signal emitting devices located at respective predetermined positions within a predetermined space . Various additional sensors may also be used for UE positioning, as explained later on.

Current 3GPP LTE Positioning Protocol (LPP) requires connected mode communication to request/receive assistance information from a location server. However, NR IoT UEs are expected to be able to stay for longer periods in idle mode (or inactive mode) so as to provide UE power saving. With this in mind, with embodiments of the present technique, the UE is able to receive the assistance information via system information in idle mode (or inactive mode) rather than via dedicated data radio bearer (DRB). The UE is therefore less likely to have to enter connected mode in order to receive assistance information, thus providing improved power saving. In addition, embodiments of the present technique also help alleviate problems associated with the limited capacity of system information for transmitting assistance information.

Information regarding NR RRC connection states is provided in 3GPP TS 38.331 V0.1.0 (2017-10), an extract of which is provided below.

3GPP TS 38.331

RRC_IDLE:
A UE specific DRX may be configured by upper layers;
UE controlled mobility based on network configuration;
The UE:
Monitors a Paging channel;
Performs neighbouring cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
   Monitors a Paging channel;
   Performs neighbouring cell measurements and cell (re-)selection;
   Performs RAN-based notification area updates when moving outside the RAN-based notification area;
FFS Whether a RAN-based notification area is always configured or not,
FFS UE behavior if it is decided that a RAN-based notification area is not always configured.
Acquires system information.
RRC_CONNECTED:
The UE stores the AS context.
Transfer of unicast data to/from UE.
At lower layers, the UE may be configured with a UE specific DRX.;
For UEs supporting CA, use of one or more SCells, aggregated with the PCell, for increased bandwidth;
For UEs supporting DC, use of one SCG, aggregated with the MCG, for increased bandwidth;
Network controlled mobility, i.e. handover within NR and to/from E-UTRAN.
The UE:
   Monitors a Paging channel;
   Monitors control channels associated with the shared data channel to determine if data is scheduled for it;

Provides channel quality and feedback information;
Performs neighbouring cell measurements and measurement reporting;
Acquires system information.

3GPP TS 38.331

In embodiments, the implementation of the present technique depends on the connection state of the UE.

In RRC_IDLE mode (idle mode), the following characteristics should be taken into account for NR positioning.

The UE does not store the AS context information, where AS refers to access stratum. AS context information includes UE specific information specified by RRC protocols. A base station is not aware of UE capability and UE ID when it receives RACH Msg1 or Msg3 from the UE. The UE is able to acquire system information. However, unicast data communication is not supported. The assistance information must thus be sent via system information.

In RRC_INACTIVE mode (inactive mode), the following characteristics should be taken into account for NR positioning.

UE transitions to RRC_INACTIVE mode and stays in it for a certain time period (e.g. 24 hours). RRC_INACTIVE mode is a lower power consumption mode compared to RRC_CONNECTED mode and the UE transitions to RRC_INACTIVE mode after initially entering RRC connected mode. This characteristic is especially suitable for low frequency communication terminals (low frequency meaning that the UE transmits or receives data less frequently that in, for example, RRC connected mode) like IoT (Internet of Things)/M2M (Machine-to-Machine).

The UE stores the AS context information. A base station of the network is aware of UE ID (Resume ID) (this having been allocated during the last connection) and, optionally, UE capability when it receives RACH Msg3 from the UE. Resume ID has not yet been decided. However, for example, Resume ID may be derived using a combination of part of base station ID and UE ID. The Resume ID may indicate relevant assistance information when a location server or a base station selects assistance information.

In RRC_CONNECTED mode (connected mode), the following characteristic should be taken into account for NR positioning.

A base station of the network can transmit unicast data to or receive unicast data from the UE. Assistance information could be exchanged via the normal LPP protocol in connected mode.

However, the UE can also acquire system information also in RCC_CONNECTED mode. There are several benefits of system information-based assistance information in connected mode. In terms of power consumption, RRC connected typically has a higher power consumption. However, a UE may be configured with a UE specific DRX (Discontinuous Reception) mode. In this case, for example, the network may adjust the DRX duration for a specific UE, e.g. making the DRX duration longer (and thus reducing UE power consumption), due to the ability to receive the assistance information as system information rather than through the use of radio resources specifically scheduled for that UE (as occurs for data which is unicast to a UE). In terms of radio resource consumption, when assistance information is transmitted via system information, a UE is able to read on-demand system information which is requested by other UEs and to store any relevant assistance information. The volume of assistance information transmitted via unicast communication is therefore reduced when the present technique is implemented, even in RRC_CONNECTED mode. This helps to save network capacity.

Figure 6:
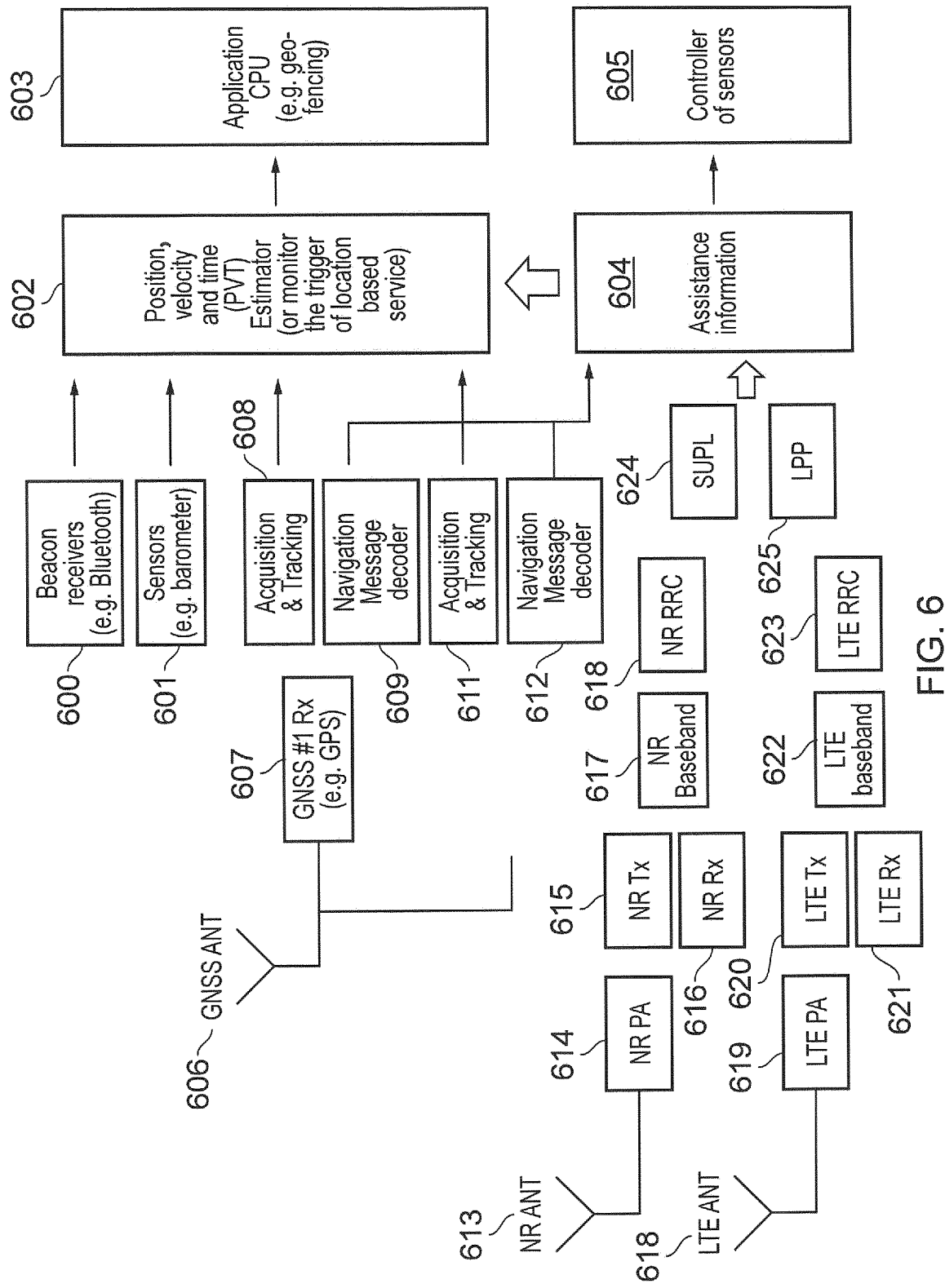
FIG. 6 schematically shows some example further components of a terminal device according to an example embodiment.

FIG. 6 schematically shows some further components of the UE 104, according to an embodiment. These components help to reduce power consumption of the UE, as will be explained.

First receiver 200 comprises GNSS antenna 606, Acquisition & Tracking circuitry 608 (for acquisition and tracking of a received GNSS signal), and a Navigation Message decoder 609. Receiving the assistance information from a cellar network (rather than via the GNSS signal) allows the UE to skip navigation message decoding, thus reducing the UE positioning time from a cold start (that is, from a time at which the UE has no positioning information). If the GNSS function of the UE is implemented using more than one system or band then, for each system or band, Acquisition & Tracking circuitry 611 and a Navigation Message decoder 612 are provided within the UE 104. The antenna may or may not share GNSS#1 receiver circuitry 607 between the different GNSS bands or systems (that is, use a single instance of GNSS#1 receiver circuitry 607 for all GNSS bands or systems), depending on the GNSS bands or systems used. In this example, the UE 104 is configured for use with two GNSS bands/systems and the GNSS#1 receiver circuitry 607 is shared for both bands/systems.

Second receiver 201 comprises NR antenna 613 and NR receiver circuitry 616 (via which the received RF signal is amplified and down converted to base band signal). NR baseband circuitry 617 provides channel coding and demodulation. RRC protocol circuitry (or circuitry implementing other protocols such as PDCP, RLC, MAC or the like) interprets the L1 signal to messages. The second receiver 201 may have LTE components instead of or in addition to NR components. Corresponding LTE components to NR components 614, 615, 616, 617 and 618 are labelled 619, 620, 621, 622 and 623, respectively. In this example, the UE 104 thus supports both NR and LTE. In idle mode and in inactive mode, the UE is required to occasionally activate the receiver circuitry 616 for cell reselection and DRX operation (e.g. paging). In connected mode, the receiver circuitry 616 should be always active except during an RRC connected mode DRX operation. The UE in RRC connected mode DRX is required to occasionally activate the receiver circuitry 616 for control channel reception and mobility management (e.g. measurements). The UE power consumption in RRC connected mode DRX can be reduced since, if assistance information has been received via an on-demand SIB in the way as described, the UE only needs to connect to the network for a time sufficient to receive updates to the assistance information (rather than to obtain the assistance information in its entirety). The DRX "wake" duration may therefore be reduced accordingly, thus reducing UE power consumption. It will thus be appreciated that the present technique allows reduced UE power consumption in idle, inactive and connected modes., Second transmitter 202 comprises NR baseband circuitry for uplink (which, in this case, is the same NR baseband circuitry 617 as used for the second receiver 201, although it may, in other embodiments, be separate circuitry) and RRC protocol circuitry for uplink (which, in this case, is the same NR protocol circuitry 618 as used for the second receiver 201, although it may, in other embodiments, be separate circuitry). The second transmitter 202 comprises NR transmitter circuitry 615 (via which a baseband signal is up-converted to RF) and power amplifier circuitry 614 to boost the transmission power of the RF signal. The RF signal is then sent via antenna 614. In idle mode and in inactive mode, the UE is not required to activate the transmitter circuitry 615 or power amplifier 614. This helps provide reduced UE power consumption.

The controller 203 is configured to implement spatial position functions and sensor processing. The controller implements a SUPL protocol 624 and LPP protocol 625. Assistance information 604 provided by information elements of the protocols 624 and 625 is decoded and stored. Sensor controller circuitry 605 (comprised as part of the controller circuitry 203) uses the assistance information 604 to configure various sensors and the one or more GNSS receivers (e.g. GNSS#1 receiver 607) of the UE. The controller 203 also implements a PVT estimate function 602 (which refers to position (P), velocity (V) and time (T)) and uses the generated P, V and/or T values for calculation positioning information of the UE 104. The Application CPU 603 (also comprised as part of the controller circuitry 203) may then use the positioning result (positioning information) for location based services such as e.g. geo-fencing applications In the context of 5G (NR) positioning, PVT estimation may not only use GNSS positioning (or, more generally, positioning based on one or more signal emitting devices, which may include GNSS satellites or indoor signal emitting devices), but also one or more other sensors of various types. Thus, in addition to or instead of the first receiver 200 being configured to receive a signal from one or more signal emitting devices, the first receiver 200 may also receive signals from one or more other sensors comprised as part of the UE 104. Such sensors may include accelerometers, gravimeters, barometer sensors, gyroscopic sensors or the like, and may be used in various ways in addition to or instead of GNSS or other emitted signals. The term "sensor" should be interpreted broadly as an element (implemented using circuitry, for example) configured to detect one or more characteristics on the basis of which a position of the UE (or at least one or more services applicable based on the position of the UE) may be determined.

Various different types of sensor may be used in combination in order to carry out UE positioning.

In one example, if a GNSS signal is lost and a barometer sensor detects a pressure drop, the UE (in particular, the controller 203) may conclude that the UE 104 has entered a basement in the building. The PVT function 602 indirectly estimates the UE position based on specific conditions (e.g. the combination of sensor output, in this case, the loss of the GNSS signal and the drop in pressure being greater than a predetermined threshold) and/or pre-configured data (e.g. a 3D map of the UE's environment, which includes the fact that there is a basement). The assistance information may comprise the data indicative of the 3D map of the UE's environment and/or the specific conditions of combined sensor output and what should be inferred from such conditions (e.g. the assistance information may indicate that a GNSS signal loss combined with drop in pressure by more than a predetermined amount should result in it being determined that the UE has entered a basement when the 3D map of the UE's environment comprises a basement).

In another example, a gyroscopic (gyro) sensor may detect that the UE 104 is stationary. In this case, the UE may deactivate the GNSS function (and/or other positioning sensors) because the UE position does not change. In an embodiment, the controller 203 may control all sensors to enter a power saving mode except for the gyro sensor, thus reducing power consumption of the UE 104.

In another example, a light sensor detects when the UE 104 is in the dark and the controller 203 determines that the user has put the UE in a pocket or the like. The controller 203 then controls the GNSS function to be deactivated and activate indoor positioning (e.g. Pedestrian Dead Reckoning (PDR)) is activated instead. In this case, the first receiver 200 may be controlled to stop receiving a GNSS signal and to start receiving signals from indoor signal emitting devices (together with relevant assistance information from the network) instead.

Thus, in the context of 5G positioning, the assistance information may be not only for use with GNSS positioning. That is, it may also include information for use in UE positioning implemented using one or more other sensors. It will be appreciated that assistance information of embodiments of the present technique may therefore comprise information of a range of different types, depending on the sensors comprised within the UE 104 requesting the assistance information and, in other embodiments, the position of the UE 104 (e.g. if the UE 104 is located within the cell of a base station located in a shopping centre, the assistance information may include a map of that shopping centre, the map, in turn, being used to influence the inferences made by the sensor output from the UE 104 (as discussed in the above-mentioned example of detecting when a UE enters a basement).

Figure 7:
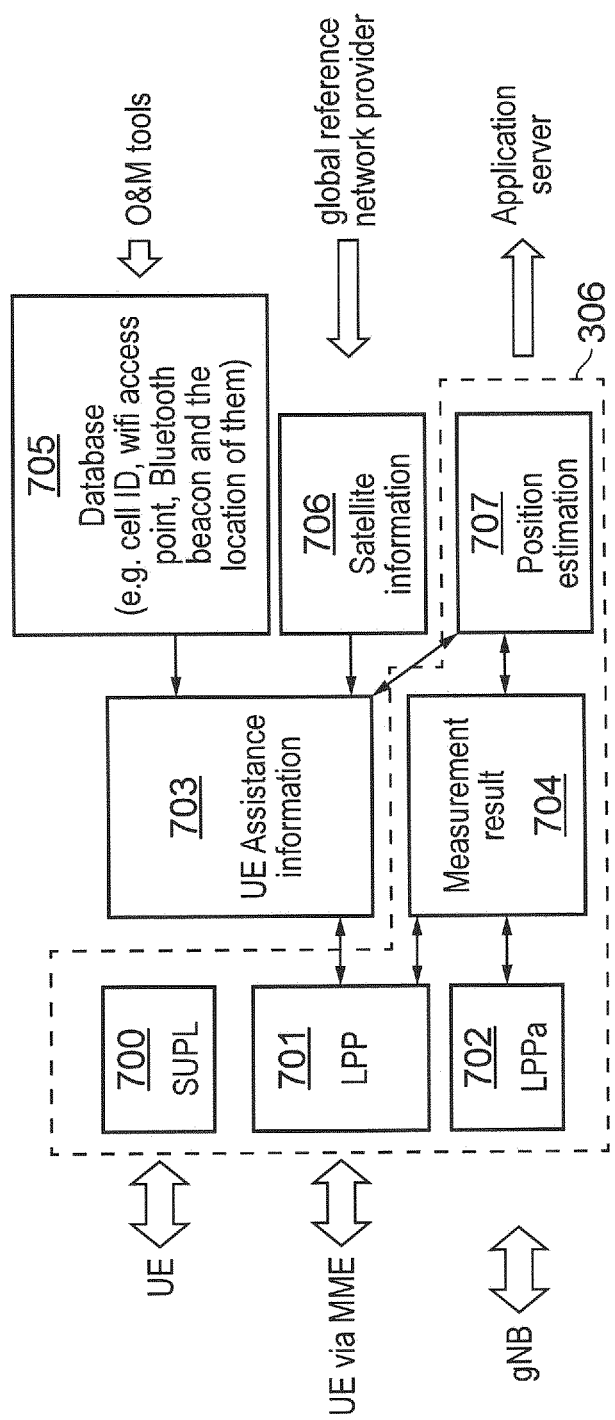
FIG. 7 schematically shows some details of a location server according to an example embodiment.

FIG. 7 schematically shows some details of a location server according to an example embodiment and shows how the location server generates assistance information.

The location server comprises circuitry for implementing 3GPP protocol functionality such as functionality of the SUPL 700, LPP 701 and LPPa 702 protocols. This circuitry is comprised as part of the network interface 209, for example. In terms of position estimation at the network side, for UE assisted positioning, the location server collects the measurement result 704 from the UE using the LPP protocol 701 and from the gNodeB(s) (e.g. via Uplink Time Difference of Arrival (UTDOA)) using the LPPa protocol 702. Position estimator circuitry 707 (which is comprised as part of the controller 210, for example) calculates the UE position based on the measurement result and information obtained via a UE assistance information server 703 (which may be implemented using the same physical hardware as the location server or different physical hardware at a different location). Alternatively, or in addition, the position estimator circuitry 707 may refer directly to database and/or satellite information. The database and/or satellite information are stored in storage medium 211 of the location server, for example. Alternatively, as in this example, the database may be stored at the UE assistance information server 703 and the satellite information may be stored at a satellite information server 706 (again, the satellite information server 706 may be implemented using the same physical hardware as the location server or different physical hardware at a different location). The position estimator circuitry 707 may comprise a storage medium for storing a previous position of the UE. Alternatively, a previous position of the UE may be stored at the UE assistance information server 703. This helps to allow suitable assistance information for the UE to be generated more quickly and using less bandwidth capacity (since assistance information likely to be irrelevant to the UE's location does not need to be obtained and transmitted to the UE).

In terms of generating UE assistance information, in an embodiment, the UE assistance information server 703 collects information from the database 705 (containing data indicative of e.g. wifi access points, Bluetooth beacon, Cell ID or the like) and from the satellite information server 706. The UE assistance information server 703 may store the UE positioning capability based on a previous connection or may retrieve it from MME 304. The data base 705 is updated using suitable operation and maintenance (O&M) tools, as is known in the art. The satellite information server 706 may be maintained by a space agency or a private company (a global reference network provider, for example). The UE assistance information server 703 can select the relevant assistance information for the UE based on UE capability (which may be stored at the UE assistance information server 703) and the current (or at least last known) UE location. The location server then transmits the assistance information to the UE with LPP over SUPL (user plane). Alternatively, the location server sends it to the UE with LPP via MME (control plane). The volume of UE assistance information for UE based positioning may be larger than that for UE assistance based because the calculation of position may requires additional assistance information.

Thus, more generally, in the embodiment of FIG. 7, UE assistance information is selected based on UE position and UE capability. The UE position is determined by position estimation circuitry 707 using a measurement result 704 obtained from the UE and, if available, previous position information of the UE stored at the UE assistance information server 703. The UE assistance information server 703 comprises a database 705 comprising assistance information and is also able to obtain satellite information from a satellite information server 706. Based on the UE position and capability (which may be received from the UE via the MME 304 or may be stored in advance at the UE assistance information server 307), relevant assistance information is determined and transmitted back to the UE via the network. It is noted that the database 705 may comprise any suitable assistance information, including location information of signal emitting devices used for indoor UE positioning (as previously explained), information relating to interpreting multiple sensor data (as previously explained) and the like.

In an embodiment, on-demand system information is used to provide positioning assistance information to the UE 104.

Firstly, the UE 104 requests on-demand system information of positioning assistance information in line with own UE positioning capability/preferences. This request is transmitted as part of the above-mentioned second signal transmitted from UE 104 to base station 101. In an embodiment, the second signal (comprising the SI request) is transmitted as part of a random access channel (RACH) procedure. Secondly, the base station 101 (for example, a gNodeB) transmits the requested system information. This is the above-mentioned third signal transmitted from base station 101 to UE 104. The system information comprises the positioning assistance information. Thirdly, the UE 104 receives the system information (comprising the positioning assistance information) and stores the positioning assistance information. Finally, the UE activates the positioning function(s) in idle mode or inactive mode (or even connected mode) in order to determine its spatial position. The UE 104 (in particular, the controller 203 determines the spatial position of the UE 104 based on information comprised within the first signal (received from a satellite and/or sensor) and the positioning assistance information. The UE may update the assistance information if it expired (e.g. if a certain time period for which the assistance information is valid expires).

In an embodiment ,the second signal comprising the SI request is transmitted as part of a RACH procedure. The SI request comprises the request for on-demand SI and an indication of the UE's capability/preference regarding which positioning technology (e.g. type of GNSS) is to be used for determining the UE's position. The second signal comprising the SI request may be transmitted as part of Msg1 or Msg3 in the RACH procedure.

Although the described embodiments primarily relate to allowing assistance information to be transmitted to UEs 104 in idle/inactive mode, it is noted that receiving on-demand system information in the way(s) described may also be useful for connected mode UEs. This is because, if such a UE is able to obtain assistance information via on-demand system information, it does not does not need to again communicate with the network to obtain the assistance information using connected mode resources.

Figure 3:
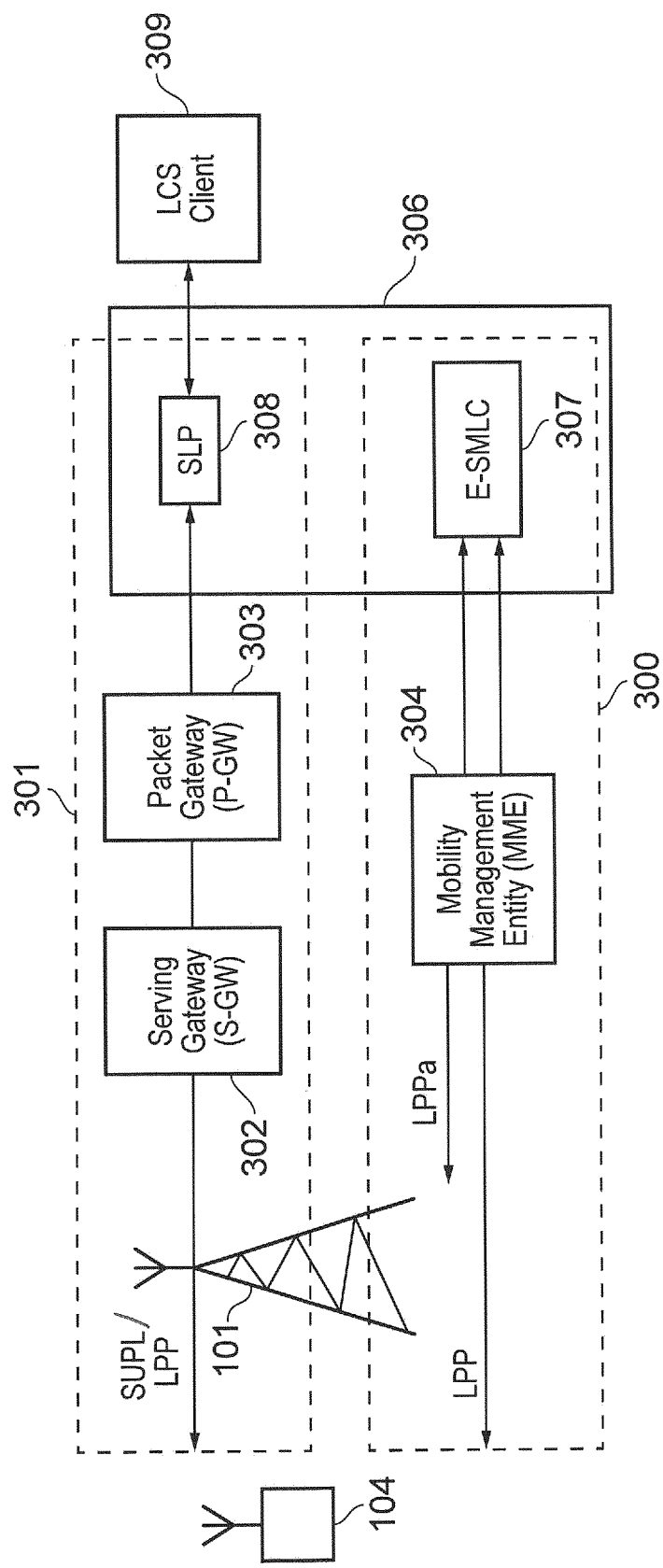
FIG. 3 schematically shows relevant portions of network architecture for terminal device positioning.

FIG. 3 schematically shows relevant portions of the network architecture for UE positioning in LTE. In the user plane (U-plane) 301, data is exchanged between the UE 104, base station 101, serving gateway 302, packet gateway 303, SLP 308 (comprised within LCS (Location Service) server (LS) 306) and LCS client 309 via the SUPL and/or LPP protocols. In the control plane (C-plane) 300, data is exchanged between the base station 101, mobile management entity (MME) 304 and E-SMLC 307 (comprised within the LS 306) via the LPPa (LTE Positioning Protocol Annexe) protocol. Furthermore, data is exchanged between the UE 104, base station 101, MME 304 and E-SMLC 307 (comprised within the LS 306) via the LPP protocol. More details regarding the architecture of FIG. 3 may be found at http://www.rohde-schwarz-wireless.com/documents/LTELBSWhitePaper_RohdeSchwarz.pdf, for example. This architecture is also applicable to NR (in which case the base station 101 will be gNobeB rather than an eNodeB).

It is noted that, conventionally, the location server (LC) 306 was the same as the E-SMLC 307 because UE positioning was implemented using a C-plane based solution only. Nowadays, however, a U-plane solution may also be used (as enabled by SUPL 2.0 protocol, for example). In embodiments of the present technique, the term "location server" should be understood to include the use of both the C-plane case and U-plane. More specifically, it is noted that the location server of embodiments may be provided by a suitable proprietary standard/cloud service of a third party company. For example, the location server be a SUPL 2.0 server (e.g. as provided by Google®) or an Apple® Cloud server (which is similar to SUPL). Of course, other such location services could be used. The location server of embodiments may be referred to as a "SUPL server". However, this should be understood to mean an SUPL server or suitable equivalent. In general, it is noted that, in 3GPP, the LPP protocol is defined between the UE 104 and location server 306. On the other hand, the Radio Resource Control (RRC) protocol is defined between the 104 UE and base station 101.

As previously mentioned, the UE 104 may be a low complexity device such as an IoT/MTC type terminal. Such UEs require very low power consumption. It will be appreciated, however, that the present technique could be applied to more complex UEs such as smartphones and the like.

The UE 104 described with reference to FIG. 2 comprises a first receiver 200, second receiver 201, transmitter 202 and controller 203. The first receiver 200 may comprise, for example, one or more GNSS sensors or antennas and/or sensors for detecting signals (e.g. radio signals) transmitted by position sensors or the like. The second receiver 201 and transmitter 202 may be implemented together to form a NR RF (radio frequency) modem and/or LTE RF modem. The controller 203 may comprise one or more central processing units (CPUs) for controlling the UE functionality. In addition, the UE 104 may comprise RRC protocol functions (on-demand system information support), one or more further sensors (e.g. barometric sensor, Terrestrial Beacon System (TBS) or the like), one or more further communication interfaces which could be used for positioning (e.g. Low power Bluetooth®, Wi-Fi® or the like—in this case, the first receiver 200 may comprise such technology and the first signal received at the first receiver 200 will be a Bluetooth® or Wi-Fi® signal on the basis of which the UE 104 may determine positioning information), a battery and/or a user interface such as a screen, keyboard or the like (it is noted that UEs such as smart phones will generally have a user interface, whereas low complexity devices such as IoT/MTC terminals may not equipped with a user interface).

As previously mentioned, although the described embodiments generally relate to GNSS assistance information, it will be appreciated that, more generally, GNSS support at the UE is not mandatory and that the UE may have one or more other elements to be used for positioning (in combination with suitable assistance information received from the network). The first receiver 200 may therefore be configured to receive signals from a GNSS satellite, indoor signal emitting device or other sensor comprised within the UE 104.

As previously mentioned, the UE 104 of embodiments is configured to perform UE based positioning. It is thus able to determine its position based on the first signal received at the first receiver 200 and the assistance information received as part of the second signal received at the second receiver 201. It does this without the need for further assistance from the network or the need to transition to connected mode, thus reducing UE power consumption.

Some examples of signalling sequences between the UE 104 and location server via a base station (in this example, a gNB) are provided below:

Request of on-demand SI (transmitted from UE to base station)
  UE is in idle mode (or inactive mode)
  UE checks the assistance information currently broadcasted in the SIBs from gNB (in an embodiment, certain assistance information common to several UEs may be broadcast in one or more predetermined SIBs without the need for such SIBs to be requested on-demand).
  If UE cannot find the required assistance information, UE sends the on-demand SI request (this may be as part of a RACH procedure, see below for details). As part of the SI request, the UE informs the base station of the positioning capability (e.g. which GNSS systems or types of indoor position sensor are supported) and/or information needed (e.g. the specific types of assistance information required by the UE).
Prepare on-demand SI (at base station and location server)
  The base station requests the required assistance information from a location server connected to the network 100
  The base station may send the positioning UE capability and/or information needed to the location server (the base station knows this since such information is included in the SI request transmitted during the RACH procedure)
  The base station may send the SIB number in which the system information (including the assistance information) is to be transmitted to the UE to the location server. The SIB number may indicate to the location server the type of assistance information (based on the UE capability, for example) required (so that SIB $x_1$ relates to a first type of assistance information, SIB $x_2$ relates to a second type of assistance information, and so on).
  The base station may send its own location to the location server (or, alternatively, the location server may have access to a database relating base station position/GNSS tracking area or the like)
Prepare on-demand SI (at base station and location server)
  The location server prepares the requested assistance information
  The location server provides the assistance information to the base station which requested the assistance information
  The location server may also distribute the assistance information in the certain area other than the request base station (e.g. neighbouring cells)
Transmit on-demand SI (transmitted from base station to UE)
  The base station starts transmitting the assistance information in the on-demand SIB
  The assistance information may be transmitted using the on-demand SIB using the base station which made the on-demand SI request. Optionally, the assistance information may also be transmitted by other base stations (e.g. neighbouring cells). This allows the assistance information to be transmitted to the UE more reliably even if the UE is moving.
  The base stations stops transmitting the assistance information after a predefined time or repetition number (that is, once the assistance information has been repeatedly transmitted a predetermined number of times)
  Alternatively or in addition, the base station may stop sending assistance information if another condition are met. For example, the UE may transmit an indicator to the base station once it has successfully received the assistance information to indicate to the base station that further repetitions of the assistance information transmission are no longer needed. In another example, the transmission of the assistance information may stop once the assistance information expires (that is, a time period for which the assistance information is valid expires)
  The base station may also notify the UE if the on-demand SI (including the assistance information or the SIB used for transmitting the assistance information) is updated. In this case, for example:
  The base station may transmit a paging message to the UE.
  The base station may then change the system value tag of the SI.
Read on-demand SI (at UE)
  UE reads on-demand SI (in idle mode or inactive mode, even connected mode)
  UE uses the assistance information provided in the on-demand SI (together with measurement of the first signal received e.g. from GNSS satellites or indoor position sensors) in order to calculate its position (UE based positioning)
  It is not necessary for acknowledge/non-acknowledge signaling to be sent from the UE to the base station (thus reducing the signaling overhead and UE power consumption).

Although embodiments of the present technique allow a UE to receive assistance information in idle mode or inactive mode (thought the use of on-demand system information to transmit the assistance information to the UE), the UE may still enter connected mode to get the assistance information via e.g. a dedicated channel or MBMS channel if the volume of assistance information is too large to accommodate the system information (this may be referred to as "dedicated system information"). After receiving the assistance information, the UE then returns to idle mode (or inactive mode) and performs the UE based positioning in inactive mode (or idle mode).

As previously mentioned, the on-demand SI request may be transmitted as part of the RACH procedure. The on-demand SI request may be transmitted in message 1 (Msg1) or message 3 (Msg3) of the RACH procedure, for example.

Figure 4:
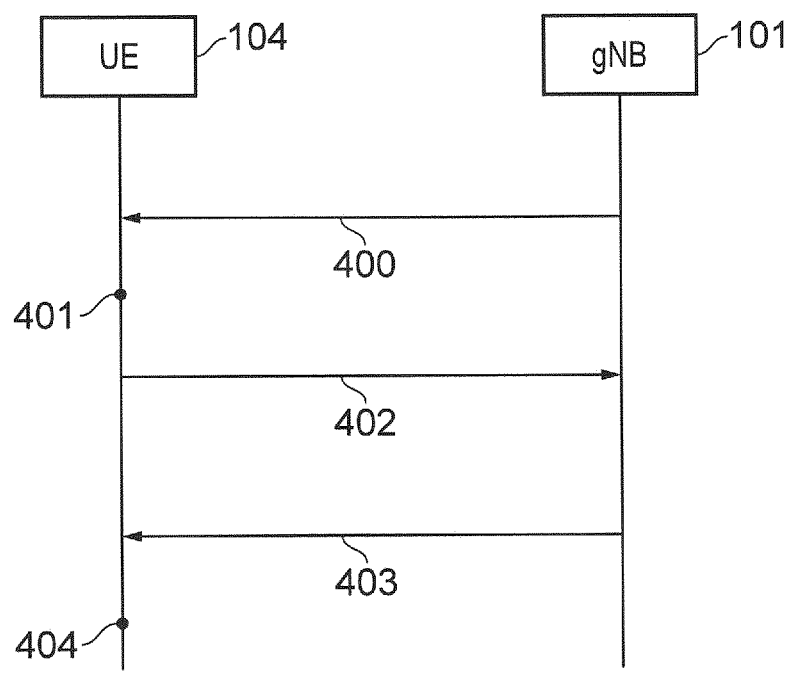
FIG. 4 schematically shows an example in which Msg1 is used for transmitting an on-demand SI request.

An example in which Msg1 is used for transmitting the on-demand SI request is shown in FIG. 4. In this example, the base station 101 is a gNB. At step 400, minimum system information (MSI) is transmitted from the base station 101 to the UE 104. At step 401, based on the MIS, the UE 104 is able to determine an identifier of the on-demand SIB (e.g. that SIB number X is the on-demand SIB) and to determine that the on-demand SI request must be transmitted in RACH Msg1. At step 402, the UE transmits the on-demand SI request to the base station as part of RACH Msg1. For example, the RACH Msg1 may comprise a specific RACH preamble (signature) which indicates to the base station that Msg1 is an on-demand SI request. At step 403, the base station 101 transmits a Random Access Response (RAR) to the UE 104. This is message 2 (Msg2) of the RACH procedure. At step 404, the UE then monitors the SI window of the on-demand SIB (e.g. SIB number X) in order to receive the assistance information.

In the arrangement of FIG. 4, it is necessary for the UE 104 to indicate to the base station 101 that the request transmitted with Msg1 is for positioning related information. A challenge with using Msg1, however, is that number of available signatures is very small. Thus, only a small number (e.g. one) of the signatures may be allocated for indicating that Msg1 comprises an on-demand SI request. There are several options in relation to this.

Option 1: One Common RACH Resource (e.g. PRACH Resources and/or Preamble) is Reserved.

With this option, only one RACH resource will be reserved in advance for assistance positioning information. After receiving an SI request using this common RACH resource from the UE:
  a) If the UE is in RRC_INACTIVE (inactive) state, then the network may still keep some UE context information including UE hardware capability information (e.g. supported GNSS types, supported position sensors, etc.). The base station is therefore able to send corresponding assistance positioning information according to UE's positioning capability.
  b) If the UE is in RRC_IDLE (idle) state, then the network may not have the UE context information. The network may therefore first send some common assistance positioning information first (e.g. specific GNSS related information such as GPS information). If the information is not enough for the UE (for example, it relates to a GNSS type not supported by the UE), then, for example, the UE may transition to RRC_CONNECTED (connected) state so as to communicate with the base station and receive the necessary assistance information.

Option 2: Several RACH Resources are Reserved

In this case, there is a mapping between reserved RACH resources and respective types of assistance positioning information. For example, RACH resource 1 may be associated with a particular GNSS type, RACH resource 2 may be associated with a particular position sensor type, RACH resource 3 may be associated with both the particular GNSS and particular sensor type, and so on.

Option 3: Consecutive Request Transmission

If the received assistance information is the information required by the UE (or is not sufficient), then the UE sends Msg1 again and request further information. The signature used may be the same as the one previously used. Alternatively, one or more signatures may be repeatedly transmitted one after the other (in a consecutive sequence) so that the signature transmitted with each successive Msg1 is toggled between the available signatures. This allows the network to more easily differentiate between a repeated Msg1 transmitted because the UE has not successfully received the assistance information even though the assistance information is suitable for use with the UE's capability (as may occur if the strength and/or quality of the third signal is low) and a repeated Msg1 transmitted because the assistance information transmitted to the UE is not suitable for use with the UE's capability. Such an arrangement is illustrated below for two signatures which are toggled.

| 1. | First. GPS L1 C/A | (signature A on Msg1) |
| 2. | Second, GPS L1C | (signature B on Msg1) |
| 3. | Third, GPS L2 | (signature A on Msg1) |
| 4. | Third, GPS L5 | (signature B on Msg1) |

It is noted that L1c is a new GPS code on the same frequency as L1 (thus providing good compatibility with e.g. the Galileo system).

Figure 5:
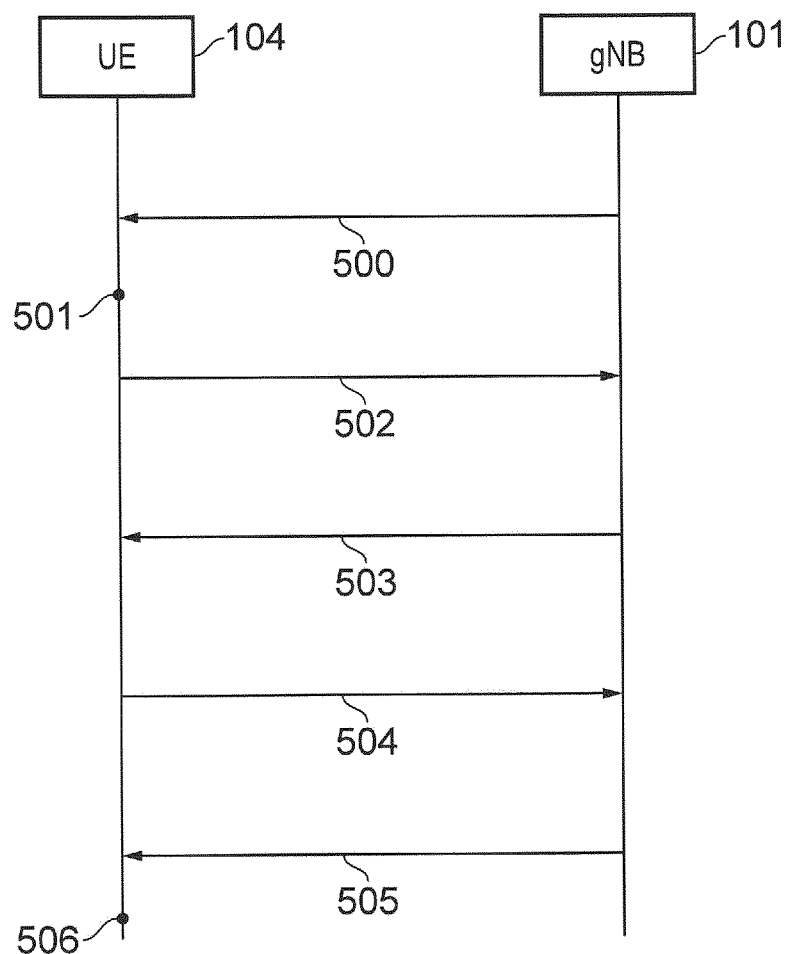
FIG. 5 schematically shows an example in which Msg3 is used for transmitting an on-demand SI request.

An example in which Msg3 is used for transmitting the on-demand SI request is shown in FIG. 5. In this example, the base station 101 is a gNB. At step 500, minimum system information (MSI) is transmitted from the base station 101 to the UE 104. At step 501, based on the MIS, the UE 104 is able to determine an identifier of the on-demand SIB (e.g. that SIB number X is the on-demand SIB) and to determine that the on-demand SI request must be transmitted in RACH Msg3. At step 502, the UE transmits RACH Msg1 to the base station. In this case, a random one of the available RACH preambles (signatures) may be transmitted in the usual way. At step 503, the base station 101 transmits a Random Access Response (RAR) to the UE 104. This is message 2 (Msg2) of the RACH procedure. The RAR includes information indicating uplink radio resources granted to the UE (e.g. on an uplink shared channel UL-SCH). At step 504, the UE transmits the on-demand SI request to the base station as part of RACH Msg3. The on-demand SI request is transmitted using one or more of the uplink resources granted to the UE, and includes, for example, the request for the on-demand SIB (e.g. SIB number X) and an identifier of the UE. At step 505, a UE Content Resolution Identity is transmitted from the base station to the UE. This is message 4 (Msg4) of the RACH procedure. At step 506, the UE then monitors the SI window of the on-demand SIB (e.g. SIB number X) in order to receive the assistance information.

In Msg3, the expected assistance positioning information will be indicated. For example, in the case that there is a predetermined mapping between assistance positioning information type (e.g. GNSS type, sensor type, or the like)and a certain identifier (e.g. numerical value), then this identifier will be included in Msg3.

A challenge associated with the use of Msg3 for transmitting the on-demand SI request is the limited message size (that is, the limited amount of data that can be transmitted using Msg3). In conventional LTE operation, for example, RACH Msg3 includes a UE-identifier (e.g. 40 bits S-TMSI (System Architecture Evolution (SEA) Temporary Mobile Subscriber Identity) or Random Value) and establishment causes (6 bits). If the conventional format is used in embodiments of the present technique, then the UE identifier (UE-ID) may be with an SI request bitmap a new establish cause may be defined for allowing the network to determine that the Msg3 comprises a positioning on-demand SI request. It is envisaged that NR may expand the size of Msg3. For example, it may be expanded to between 10 bytes (80 bits) and 16 bytes (128 bits) (see e.g. 3GPP Tdoc R2-1710199). The positioning capability indication (e.g. GNSS type, sensor type, or the like) should also be accommodated within Msg3 of a given size.

Conventional LPP has a large data capacity for communication because it is directed for us in connected mode (rather than idle or inactive mode, as enabled by the present technique). Thus, LPP assumes that the UE sends all the related positioning capability information to the location server (via the base station) in advance. On the other hand, in an embodiment of the present technique in which an on-demand SI request is transmitted within Msg3, there are limits on the amount of data that can be sent. It may therefore not be possible to transmit all the positioning capability information that would normally be sent in connected mode using conventional LPP. Embodiments of the present technique help alleviate this problem.

The solutions of embodiments include:
Transmit only a portion of the UE positioning capability information. This provides a simple way of providing at least some UE positioning capability information to the network using the limited capacity Msg3 message. For example, only a part of A-GNSS-ProvideCapabilities (e.g. GNSS-ID) may be transmitted. More generally, the minimum positioning capability information possible in order for the UE to be able to receive suitable assistance information may be transmitted.
Use of a compact bitmap. A new bitmap is defined for transmitting UE positioning capability information on Msg3. An example of such a bitmap is explained later on.
Use of a positioning category. A new category is defined for typical positioning capability which is smaller than the Msg3 size. For example, positioning category-1 supports only GPS and positioning category-2 supports GPS and Galileo.

In an embodiment, the UE's approximate position (based on, for example, the location of the base station(s) with which the UE is able to receive signals) is known by the network. This is possible, for example, when the UE is in an inactive (e.g. RRC_INACTIVE) state. In this case, only assistance information necessary based on the UE's approximate position is transmitted to the UE. For example, for the case of GNSS assistance information, only information for satellites which may serve the UE at the UE's approximate position (e.g. covering a geographical area comprising the approximate position of the UE) is transmitted as assistance information to the UE.

In terms of supported GNSS bands/frequencies, Upper L-band (e.g. L1 C/A in GPS) is most common use for GNSS systems. Lower L-bands are more recently supported, in particular for high end, special terminal devices. The supported GNSS bands/frequencies may form part of the positioning capability information of the UE. Further information on GNSS bands/frequencies may be found at, for example: http://cdn.rohde-schwarz.com/pws/dl_downloads/dl_application/application_notes/1ma203/1MA203_0e_BeiDouSWReceiver.pdf As previously mentioned, UE positioning capability information may be transmitted with the Msg3 on-demand SI request using suitable bitmap information. Such bitmap information is designed to be of a sufficiently small data size such that it can be transmitted within the limited data size of Msg3. Such bitmap information may be referred to as a "compact" bitmap.

In an embodiment, a bitmap is made compact by omitting certain default values in the signalling (these default values may therefore be implicit instead). Some examples of such default information which may be omitted are given below:
Supported bands/signal based
Some bands are very commonly supported among UEs. For example, all terminals having a GPS receiver must support L1 C/A. On the other hand, L2 or L5 may only be supported if the terminal has higher capability (because a dual receiver is required). Thus, L1 C/A could be a default setting. A UE therefore does not indicate L1 C/A support in the positioning capability information transmitted to the network. Such an arrangement could also be applied to other commonly supported bands.
In another example, if a UE supports QZSS, it is also high likely to support GPS because the QZSS signal in L1 is compatible with GPS. Thus, GPS capability should be a default (and therefore omissible in the position capability signaling from the UE) and QZSS optional (and thus explicitly indicated in the position capability signaling from the UE if supported by the UE).
In another example, if a UE supports Gallileo E5a/E5b, then GPS L1 or GLONASS G3/BEIDOU G3 may also be supported because the frequencies used in these technologies overlap. GLONASS G3/BEIDOU G3 may therefore be a default (and therefore omissible in the position capability signaling from the UE) and Gallileo E5a/E5b optional (and thus explicitly indicated in the position capability signaling from the UE if supported by the UE). More generally, it will thus be appreciated that support of one GNSS type may imply support for another GNSS type. Only support for the former GNSS type need therefore be explicitly indicated to the network in the bitmap.
Location based
Base station location based/Tracking area based
A base station knows its own location
After receiving the positioning on-demand SI request from the UE, the base station requests the relevant assistance information from the location server and, at the same time, provides the location server with its own (i.e. the base station's) position.
The location server selects the relevant assistance information (based on the position of the base station) and sends it to the base station (which subsequently provides the assistance information to the UE).
Country code
Some GNSSs are supported in a specific region (these are known as regional navigation satellite system (RNSS)). The UE may therefore only provide capability information of RNSS (where applicable) when located in a region in which that RNSS is supported. For example, QZSS is supported only in Japan and other South/East Asian countries and Australia. QZSS will therefore only be identified in position capability information transmitted by the UE when that UE is located in one of these countries.

A UE can easily determine its current operation country using the mobile country code (MCC) provided via system information.

If the UE, based on its current operating country, knows that a certain RNSS is not supported, then information indicating such RNSS support may be omitted from the positioning capability information transmitted by the UE. For example, if a UE supports QZSS but is not in a country in which QZSS is not supported, then information (e.g. a bit) indicating QZSS bit omissible from the capability information transmitted by the UE.

GNSS Service based
  Galileo supports following services.
    Open Service (OS)
    Commercial Service (CS)
    Public Regulated Service (PRS)
    Search and Rescue Service (SAR)
  The Open Service is provided for the public free of charge. This is therefore the most commonly used service in the above list. The Commercial Service (CS) is of higher accuracy, but is only available to limited users. Thus, OS should be the default (and omitted from the transmitted capability information). CS can then be included in the capability information when appropriate.

System information block number (SIBx) based
  This bitmap indicates simply the SIBx combinations which UE needs. Thus, rather than the UE indicating each of its individual capabilities (that is, each configuration supported by the UE for determining the UE's spatial position, such as GNSS type (GPS L1 C/A, GPS L2, Galileo E5 OS, etc. or, more generally, GPS, Galileo, etc.), position sensor type, and the like), the UE indicates the SIB number(s) in which assistance information associated with those capabilities are transmitted (as known in advance). In this case, a plurality of different on-demand SIBs are each associated in advance with a respective one or more capabilities. Assistance information is therefore transmitted in different SIBs for different capabilities, and the UE is able to request only those SIBs applicable to its capabilities using their respective SIB numbers.

The used of a compact bitmap (such as those described above) with an omissible default value has been described with reference to Msg3. However, it will be appreciated that such a technique could also be used with Msg1 (to help alleviate the problems associated with signature number limitation, for example). For example, if a UE supports multiple GNSS types, then a default value may be the most common combination of these GNSS types. When the base station receives Msg1 comprising a common signature, the base station provides the assistance information for the combination of the most common GNSS types (e.g. GPS L1 C/A, Gallileo E5 OS, GLONASS G1 and Beidou B1). If the UE supports GNSS types other than this default combination, then the UE may issue further positioning SI requests comprising capability information indicating these further GNSS types (or, more generally, further configurations for use by the UE in determining its spatial position). The further positioning SI requests may be transmitted as part of Msg3, for example.

In embodiments, the contents of assistance information (sent from a location server to a UE via a base station, for example) may comprise existing assistance information such as A-GNSS information in LTE REL-13 (see, for example, 3GPP TS 36.305 V13.0.0 (2015-12)). The assistance information sent from a location server to a UE (via a base station) may comprise GNSS information for UE based measurement (see again, for example, 3GPP TS 36.305 V13.0.0 (2015 December)). This allows the UE to determine its spatial position based on measurements of first signals transmitted from GNSS satellites and the received GNSS assistance information (which is received as a third signal).

A summary of a number of features of the embodiments of the present technique is provided below:

Signaling procedure #1(checking the current SIBs before sending Msg1)
  UE receives the assistance information of a first SIB which is currently transmitted by base station
  UE can know whether the necessary information is transmitted or not in the SIB compared to stored information at the UE, for example:
    By the system value tag (i.e. version of information)
    Or, by validity area of assistance information (that is, the geographical area over which the assistance information is valid)
    Or, by validity time of assistance information (that is, a time period over which the assistance information is valid)
  If UE needs new information or additional information, then UE moves to RACH procedure.

Signaling procedure #2(RACH Msg1; common)
  In-active mode on-demand SI procedure
    UE sends the common RACH signature, then eNodeB transmits the assistance information via SIBx which is based on the UE capability in line with the UE context of in-active UEs.
  Idle mode on-demand SI procedure
    UE sends the common RACH signature, then eNodeB transmits the minimum assistance information via SIBx. UE receives the minimum assistance information and checks the contents. UE requests further SI if UE needed.

Signaling procedure #3(Msg3; specific request)
  In-active mode on-demand SI procedure
    UE sends the RACH Msg3,
      RACH Msg3 indicates the supported and/or preferred positioning methods (e.g. GNSS types) of the UE
      Alternatively, where the RACH Msg3 indicates the inactive mode UE ID (UE identifier), the eNodeB may know the supported positioning methods of that specific UE
  Idle mode on-demand SI procedure
    RACH Msg3 indicates the supported and/or preferred positioning methods (e.g. GNSS types) of the UE
    Once the eNodeB knows the supported positioning methods of the UE, it may send the relevant assistance information.

Figure 8:
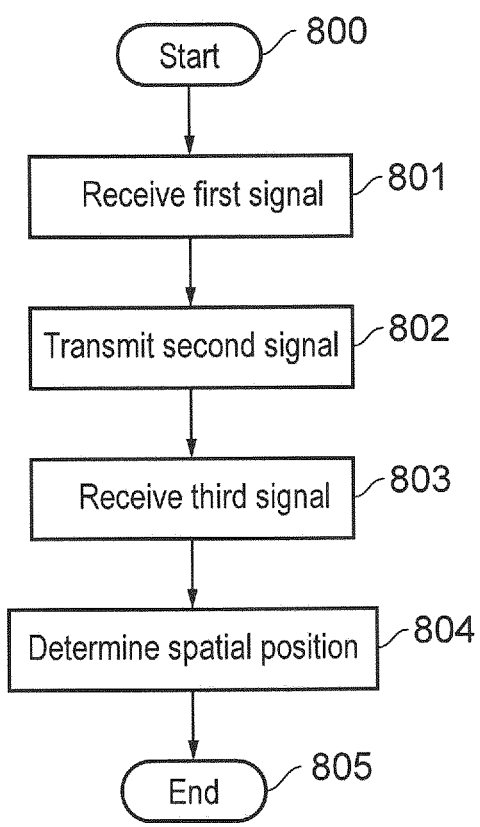
FIG. 8 schematically shows a method of operating a terminal device according to an example embodiment.

Signaling contents (dependent claims under procedure)
   Msg1
      Assistance information of UE positioning
      Requested SIB number (if new SIBx is allocated for positioning)
   Msg3
      Includes Inactive UE ID/UE Context ID
      Includes UE capability/supported sensors
      Includes UE preference of activate sensors
   Assistance information
      includes the expired time/date of it (to avoid checking value tag many times)
      includes the valid area of it
Location server side
   Location server receives the positioning UE capability on the assistance information request from the base station
   Location server may store the positioning UE capability determined for a previous connection between the UE and the network.
   Location server may receive the current UE position from the base station.
   Location server may estimate the current UE position from a previous connection between the UE and the network.
   Location server determines the assistance information and distributes it to the base station (and, optionally, one or more further base stations in the relevant geographical area) area based on the request from the UE and the estimated position of the UE.
Base station side
   A base station (e.g. eNodeB or gNodeB) receives the request for on-demand system information.
   A base station transmits on-demand system information based on UE request and UE capability.
   If idle mode, base station sends the requested SI.
   If inactive mode, base station checks the UE capability and preference in the previous connection and sends the SI.
   A base station transmits SI update notification if an unexpected update is needed.
UE side
   A UE (NR UE) requests on-demand system information comprising positioning assistance information when the UE is idle mode/inactive mode
   UE informs base station of the UE capability of positioning in the on-demand SI request (in inactive mode)
   UE does not request positioning assistance information if it has already been broadcast (e.g. in LTE SIB16)
   UE performs positioning in idle mode/in-active mode with the assistance information received in the on-demand SI FIG. 8 schematically shows a method of operating a terminal device 104 according to an embodiment. The method starts at step 800. At step 801, the first receiver circuitry 200 is controlled to receive a first signal. At step 802, the transmitter circuitry 202 is controlled to transmit a second signal to infrastructure equipment 101 of the wireless telecommunications network. At step 803, the second receiver circuitry 202 is controlled to receive a third signal from the infrastructure equipment, the third signal being transmitted by the infrastructure equipment in response to the infrastructure equipment receiving the second signal, the third signal being for determining, in combination with the first signal, the spatial position of the terminal device, and the third signal being comprised within a system information block (SIB). At step 804, a spatial position of the terminal device is determined based on the received first and third signals. The process then ends at step 805.

Figure 9:
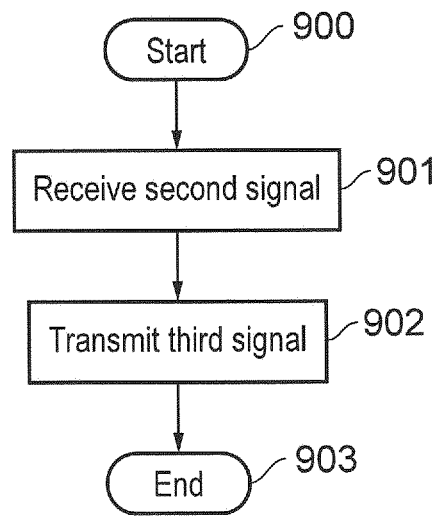
FIG. 9 schematically shows a method of operating infrastructure equipment according to an example embodiment.

FIG. 9 schematically shows a method of operating infrastructure equipment 101 according to an embodiment. The method starts at step 900. At step 901, the receiver circuitry 204 is controlled to receive a second signal from a terminal device 104 of the wireless telecommunications network. At step 902, the transmitter circuitry 205 is controlled to transmit a third signal to the terminal device, the third signal being transmitted in response to the reception of the second signal, the third signal being for the terminal device to determine, in combination with a first signal received by the terminal device, the spatial position of the terminal device, and the third signal being comprised within a system information block (SIB). The process then ends at step 903.

Figure 10:
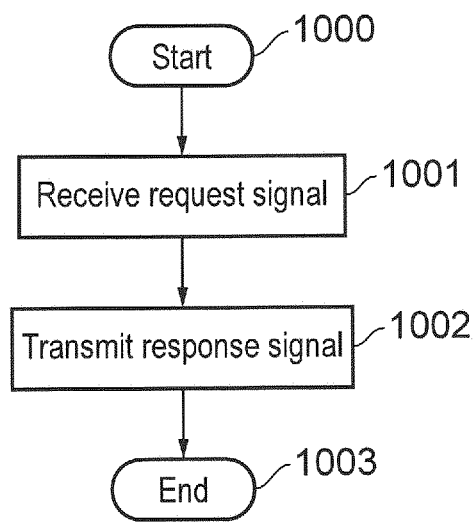
FIG. 10 schematically shows a method of operating a data processing apparatus for use as a location server according to an example embodiment.

FIG. 10 schematically shows a method of operating a data processing apparatus 306 according to an embodiment. The method starts at step 1000. At step 1001, communication circuitry (in the form of network interface 209, for example) is controlled to receive, from infrastructure equipment 101 of a wireless telecommunications network, a request signal for information for determining a spatial position of a terminal device 104 of the wireless telecommunications network, the request signal being transmitted by the infrastructure equipment in response to the infrastructure equipment receiving a second signal transmitted by the terminal device. At step 1002, the communication circuitry is controlled to transmit to the infrastructure equipment, in response to the received request signal, a response signal comprising information for determining the spatial position of the terminal device, the response signal being for use by the infrastructure equipment to generate a third signal to be transmitted from the infrastructure equipment to the terminal device for the terminal device to determine, in combination with a first signal received by the terminal device, the spatial position of the terminal device, the third signal being comprised within a system information block (SIB).

Various embodiments of the present technique are defined by the following numbered clauses:

1. A terminal device for use in a wireless telecommunications network, the terminal device comprising:
   first receiver circuitry configured to receive a first signal;
   transmitter circuitry configured to transmit a second signal to infrastructure equipment of the wireless telecommunications network;
   second receiver circuitry configured to receive a third signal from the infrastructure equipment, the third signal being transmitted by the infrastructure equipment in response to the infrastructure equipment receiving the second signal, the third signal being for determining, in combination with the first signal, the spatial position of the terminal device, and the third signal being comprised within a system information block (SIB); and
   control circuitry configured to determine a spatial position of the terminal device based on the received first and third signals.

2. A terminal device according to clause 1, wherein the first signal is received from each of one or more signal emitting devices located at respective spatial positions.

3. A terminal device according to clause 2, wherein the third signal indicates a spatial position of each of the one or more signal emitting devices.

4. A terminal device according to clause 2 or 3, wherein each of the one or more signal emitting devices is a Global Navigation Satellite System (GNSS) satellite.

5. A terminal device according to clause 2 or 3, wherein each of the one or more signal emitting devices is a located at a respective predetermined position within a predetermined contained geographical space.

6. A terminal device according to any one of clauses 2 to 5, wherein:
   the control circuitry is configured to determine the spatial position of the terminal device with respect to each of the one or more signal emitting devices based on a measurement of a characteristic of the first signal transmitted by each of the one or more signal emitting devices; and
   the third signal indicates the respective spatial position of each of the one or more signal emitting devices.

7. A terminal device according to any preceding clause, wherein the first signal is received from one or more sensors each configured to detect a characteristic on the basis of which information indicative of a spatial position of the terminal device is determinable.

8. A terminal device according to clause 7, wherein the third signal indicates how the characteristic detected by each of the one or more sensors is to be used to determine the information indicative of the spatial position of the terminal device.

9. A terminal device according to clause 1, wherein:
   the second receiver circuitry is configured to receive information comprised within another SIB transmitted by the infrastructure equipment prior to transmission of the SIB transmitted by the infrastructure equipment in response to the infrastructure equipment receiving the second signal;
   the control circuitry is configured to determine whether the information comprised within the other SIB is sufficient to determine, in combination with the first signal, the spatial position of the terminal device;
   wherein, when it is determined that the information comprised within the other SIB is not sufficient to determine, in combination with the first signal, the spatial position of the terminal device, the control circuitry is configured to control the transmitter circuitry to transmit the second signal to the infrastructure equipment of the wireless telecommunications network.

10. A terminal device according to clause 9, wherein the control circuitry is configured to determine whether the information comprised within the other SIB is sufficient to determine, in combination with the first signal, the spatial position of the terminal device based on one of a system value tag of the other SIB, a validity area of the information comprised within the other SIB and a validity time of the information comprised within the other SIB.

11. A terminal device according to any preceding clause, wherein the second signal is transmitted as part of a random access (RACH) procedure carried out by the terminal device and infrastructure equipment.

12. A terminal device according to clause 11, wherein the second signal is comprised within a first message (Msg1) of the RACH procedure transmitted from the terminal device to the infrastructure equipment.

13. A terminal device according to clause 12, wherein the second signal comprises a predetermined RACH signature.

14. A terminal device according to clause 11, wherein the second signal is comprised within a third message (Msg3) of the RACH procedure transmitted from the terminal device to the infrastructure equipment.

15. A terminal device according to clause 14, wherein the second signal indicates a type of information to be provided by the third signal.

16. A terminal device according to clause 15, wherein the second signal indicates one or more types of signal emitting device from which the first receiver circuitry is configured to receive a first signal.

17. A terminal device according to clause 10, wherein the second signal indicates one or more types of sensor from which the first receiver circuitry is configured to receive a first signal.

18. A terminal device according to any one of clauses 14 to 16, wherein the second signal indicates an identifier of the UE.

19. Infrastructure equipment for use in a wireless telecommunications network, the infrastructure equipment comprising:
   receiver circuitry configured to receive a second signal from a terminal device of the wireless telecommunications network;
   transmitter circuitry configured to transmit a third signal to the terminal device, the third signal being transmitted in response to the reception of the second signal, the third signal being for the terminal device to determine, in combination with a first signal received by the terminal device, the spatial position of the terminal device, and the third signal being comprised within a system information block (SIB).

20. Infrastructure equipment according to clause 19, wherein the first signal is received by the terminal device from each of one or more signal emitting devices located at respective spatial positions.

21. Infrastructure equipment according to clause 20, wherein the third signal indicates a spatial position of each of the one or more signal emitting devices.

22. Infrastructure equipment according to clause 20 or 21, wherein each of the one or more signal emitting devices is a Global Navigation Satellite System (GNSS) satellite.

23. Infrastructure equipment according to clause 20 or 21, wherein each of the one or more signal emitting devices is a located at a respective predetermined position within a predetermined contained geographical space.

24. Infrastructure equipment according to any one of clauses 20 to 23, wherein:
   the terminal device is configured to determine its spatial position with respect to each of the one or more signal emitting devices based on a measurement of a characteristic of the first signal transmitted by each of the one or more signal emitting devices; and
   the third signal indicates the respective spatial position of each of the one or more signal emitting devices.

25. Infrastructure equipment according to any preceding clause, wherein the terminal device is configured to receive the first signal from each of one or more sensors each configured to detect a characteristic on the basis of which information indicative of a spatial position of the terminal device is determinable.

26. Infrastructure equipment according to clause 25, wherein the third signal indicates how the characteristic detected by each of the one or more sensors is to be used to determine the information indicative of the spatial position of the terminal device.

27. Infrastructure equipment according to any one of clauses 19 to 26 , wherein the second signal is transmitted as part of a random access (RACH) procedure carried out by the terminal device and infrastructure equipment.

28. Infrastructure equipment according to clause 27, wherein the second signal is comprised within a first message (Msg1) of the RACH procedure transmitted from the terminal device to the infrastructure equipment.

29. Infrastructure equipment according to clause 28, wherein the second signal comprises a predetermined RACH signature.

30. Infrastructure equipment according to clause 27, wherein the second signal is comprised within a third message (Msg3) of the RACH procedure transmitted from the terminal device to the infrastructure equipment.

31. Infrastructure equipment according to clause 30, wherein the second signal indicates a type of information to be provided by the third signal.

32. Infrastructure equipment according to clause 31, wherein the second signal indicates one or more types of signal emitting device from which the first receiver circuitry is configured to receive a first signal.

33. Infrastructure equipment according to clause 31, wherein the second signal indicates one or more types of sensor from which the terminal device is configured to receive a first signal.

34. Infrastructure equipment according to any one of clauses 30 to 33, wherein the second signal indicates an identifier of the UE.

35. Infrastructure equipment according to any one of clauses 19 to 34, comprising network interface circuitry configured to transmit, to a location server, information based on the second signal and to receive, from the location server, information for generating the third signal.

36. A data processing apparatus comprising communication circuitry configured:
to receive, from infrastructure equipment of a wireless telecommunications network, a request signal for information for determining a spatial position of a terminal device of the wireless telecommunications network, the request signal being transmitted by the infrastructure equipment in response to the infrastructure equipment receiving a second signal transmitted by the terminal device; and
to transmit to the infrastructure equipment, in response to the received request signal, a response signal comprising information for determining the spatial position of the terminal device, the response signal being for use by the infrastructure equipment to generate a third signal to be transmitted from the infrastructure equipment to the terminal device for the terminal device to determine, in combination with a first signal received by the terminal device, the spatial position of the terminal device, the third signal being comprised within a system information block (SIB).

37. A data processing apparatus according to clause 36, wherein the communication circuitry is configured to receive the request signal generated in response to the infrastructure equipment receiving the second signal transmitted by the terminal device and to transmit the response signal to the infrastructure equipment for generation of the third signal for transmission to the terminal device using a suitable wireless telecommunications location protocol.

38. A data processing apparatus according to clause 36 or 37, wherein:
the first signal is received by the terminal device from each of one or more signal emitting devices located at respective spatial positions;
the terminal device is configured to measure a characteristic of the first signal transmitted by each of the one or more signal emitting devices and to provide information indicative of the measured characteristic of the first signal transmitted by each of the one or more signal emitting devices to the infrastructure equipment as part of the second signal;
the request signal comprises the information indicative of the measured characteristic of the first signal transmitted by each of the one or more signal emitting devices; and
the data processing apparatus comprises control circuitry configured to:
obtain, from a database, the respective spatial position of each of the one or more signal emitting devices;
determine, based on the respective spatial position of each of the one or more signal emitting devices and the measured characteristic of the first signal transmitted by each of the one or more signal emitting devices, the spatial position of the terminal device;
control the communication circuitry to include information indicative of the determined spatial position of the terminal device in the response signal transmitted to the infrastructure equipment.

39. A data processing apparatus according to clause 38, wherein each of the one or more signal emitting devices is a Global Navigation Satellite System (GNSS) satellite.

40. A data processing apparatus according to clause 38, wherein each of the one or more signal emitting devices is located at a respective predetermined position within a predetermined contained geographical space.

41. A data processing apparatus according to any one of clauses 36 to 40, wherein:
the first signal is received by the terminal device from one or more sensors each configured to detect a characteristic on the basis of which information indicative of a spatial position of the terminal device is determinable;
the terminal device is configured to provide information indicative of the characteristic detectable by each of the one or more sensors to the infrastructure equipment as part of the second signal;
the request signal comprises the information indicative of the characteristic detectable by each of the one or more sensors; and
the data processing apparatus comprises control circuitry configured to:
obtain, from a database, information indicative of how the characteristic detectable by each of the one or more sensors is to be used to determine the information indicative of the spatial position of the terminal device;
control the communication circuitry to include the information indicative of how the characteristic detectable by each of the one or more sensors is to be used to determine the information indicative of the spatial position of the terminal device in the response signal transmitted to the infrastructure equipment.

42. A method of operating a terminal device for use in a wireless telecommunications network, the terminal device comprising first receiver circuitry, transmitter circuitry and second receiver circuitry, wherein the method comprises:
controlling the first receiver circuitry to receive a first signal;
controlling the transmitter circuitry to transmit a second signal to infrastructure equipment of the wireless telecommunications network;
controlling the second receiver circuitry to receive a third signal from the infrastructure equipment, the third signal being transmitted by the infrastructure equipment in response to the infrastructure equipment receiving the second signal, the third signal being for determining, in combination with the first signal, the spatial position of the terminal device, and the third signal being comprised within a system information block (SIB); and determining a spatial position of the terminal device based on the received first and third signals.

43. A method of operating infrastructure equipment for use in a wireless telecommunications network, the infrastructure equipment comprising receiver circuitry and transmitter circuitry, wherein the method comprises:

controlling the receiver circuitry to receive a second signal from a terminal device of the wireless telecommunications network;

controlling the transmitter circuitry to transmit a third signal to the terminal device, the third signal being transmitted in response to the reception of the second signal, the third signal being for the terminal device to determine, in combination with a first signal received by the terminal device, the spatial position of the terminal device, and the third signal being comprised within a system information block (SIB).

44. A method of operating a data processing apparatus, the data processing apparatus comprising communication circuitry, wherein the method comprises:

controlling the communication circuitry to receive, from infrastructure equipment of a wireless telecommunications network, a request signal for information for determining a spatial position of a terminal device of the wireless telecommunications network, the request signal being transmitted by the infrastructure equipment in response to the infrastructure equipment receiving a second signal transmitted by the terminal device; and controlling the communication circuitry to transmit to the infrastructure equipment, in response to the received request signal, a response signal comprising information for determining the spatial position of the terminal device, the response signal being for use by the infrastructure equipment to generate a third signal to be transmitted from the infrastructure equipment to the terminal device for the terminal device to determine, in combination with a first signal received by the terminal device, the spatial position of the terminal device, the third signal being comprised within a system information block (SIB).

45. Circuitry for a terminal device for use in a wireless telecommunications network, the circuitry comprising:

first receiver circuitry configured to receive a first signal;

transmitter circuitry configured to transmit a second signal to infrastructure equipment of the wireless telecommunications network;

second receiver circuitry configured to receive a third signal from the infrastructure equipment, the third signal being transmitted by the infrastructure equipment in response to the infrastructure equipment receiving the second signal, the third signal being for determining, in combination with the first signal, the spatial position of the terminal device, and the third signal being comprised within a system information block (SIB); and control circuitry configured to determine a spatial position of the terminal device based on the received first and third signals.

46. Circuitry for infrastructure equipment for use in a wireless telecommunications network, the circuitry comprising:

receiver circuitry configured to receive a second signal from a terminal device of the wireless telecommunications network;

transmitter circuitry configured to transmit a third signal to the terminal device, the third signal being transmitted in response to the reception of the second signal, the third signal being for the terminal device to determine, in combination with a first signal received by the terminal device, the spatial position of the terminal device, and the third signal being comprised within a system information block (SIB).

47. Circuitry for a data processing apparatus, the circuitry comprising communication circuitry configured:

to receive, from infrastructure equipment of a wireless telecommunications network, a request signal for information for determining a spatial position of a terminal device of the wireless telecommunications network, the request signal being transmitted by the infrastructure equipment in response to the infrastructure equipment receiving a second signal transmitted by the terminal device; and to transmit to the infrastructure equipment, in response to the received request signal, a response signal comprising information for determining the spatial position of the terminal device, the response signal being for use by the infrastructure equipment to generate a third signal to be transmitted from the infrastructure equipment to the terminal device for the terminal device to determine, in combination with a first signal received by the terminal device, the spatial position of the terminal device, the third signal being comprised within a system information block (SIB).

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] http://www.3gpp.org/DynaReport/36-series.htm
[2] http://www.3gpp.org/DynaReport/38-series.htm
[3] 3GPP TS 36.305: "Stage 2 functional specification of User Equipment (UE) positioning in E-UTRAN".
[4] 3GPP TS 36.355: "Evolved Universal Terrestrial Radio Access (E-UTRA); LTE Positioning Protocol (LPP)"
[5] 3GPP TS 23.271: "Functional stage 2 description of Location Services (LCS)".
[6] OMA Secure User Plane Location (SUPL)

The invention claimed is:

1. A terminal device for use in a wireless telecommunications network, the terminal device comprising:
first receiver circuitry configured to receive one or more satellite signals from one or more Global Navigation Satellite System (GNSS) satellites located at respective spatial positions;
transmitter circuitry configured to transmit a first signal including an on-demand system information (SI) request to infrastructure equipment of the wireless telecommunications network;
second receiver circuitry configured to receive positioning assistance data from the infrastructure equipment, the positioning assistance data being transmitted by the infrastructure equipment in response to the infrastructure equipment receiving the on-demand SI request and indicating a respective spatial position of the respective spatial positions of each of the one or more GNSS satellites the position assistance data comprised within a first system information block (SIB); and
control circuitry configured to determine a spatial position of the terminal device with respect to each of the one or more GNSS satellites based on the position assistance data and one or more measurement characteristics of the one or more satellite signals received from the one or more GNSS satellites, wherein
the second receiver circuitry is configured to receive information comprised within a second SIB transmitted by the infrastructure equipment prior to transmission of the first SIB transmitted by the infrastructure equipment in response to the infrastructure equipment receiving the first signal,
the control circuitry is configured to determine whether the information comprised within the second SIB is sufficient to determine, in combination with the one or more satellite signals, the spatial position of the terminal device, and
when it is determined that the information comprised within the second SIB is not sufficient to determine, in combination with the one or more satellite signals, the spatial position of the terminal device, the control circuitry is configured to control the transmitter circuitry to transmit the first signal to the infrastructure equipment of the wireless telecommunications network.

2. The terminal device of claim 1, wherein
each of the one or more GNSS satellites is located at a respective predetermined position within a predetermined geographical space.

3. The terminal device of claim 1, wherein
the first signal is transmitted as part of a random access (RACH) procedure carried out by the terminal device and infrastructure equipment.

4. The terminal device of claim 3, wherein
the first signal is comprised within a first message (Msg1) of the RACH procedure transmitted from the terminal device to the infrastructure equipment.

5. The terminal device of claim 4, wherein
the first signal comprises a predetermined RACH signature.

6. The terminal device of claim 3, wherein
the first signal is comprised within a third message (Msg3) of the RACH procedure transmitted from the terminal device to the infrastructure equipment.

7. The terminal device of claim 6, wherein
the first signal indicates a type of information to be provided by the infrastructure equipment.

8. The terminal device of claim 7, wherein
the first signal indicates one or more types of signal emitting device from which the first receiver circuitry is configured to receive a first signal.

9. The terminal device according to claim 6, wherein the first signal indicates an identifier of the UE.

10. A terminal device for use in a wireless telecommunications network, the terminal device comprising:
first receiver circuitry configured to receive a first signal;
transmitter circuitry configured to transmit a second signal to infrastructure equipment of the wireless telecommunications network;
second receiver circuitry configured to receive a third signal from the infrastructure equipment, the third signal being transmitted by the infrastructure equipment in response to the infrastructure equipment receiving the second signal, the third signal being for determining, in combination with the first signal, the spatial position of the terminal device, and the third signal being comprised within a first system information block (SIB); and
control circuitry configured to determine a spatial position of the terminal device based on the received first and third signals, wherein:
the second receiver circuitry is configured to receive information comprised within a second SIB transmitted by the infrastructure equipment prior to transmission of the first SIB transmitted by the infrastructure equipment in response to the infrastructure equipment receiving the second signal;
the control circuitry is configured to determine whether the information comprised within the second SIB is sufficient to determine, in combination with the first signal, the spatial position of the terminal device;
wherein, when it is determined that the information comprised within the second SIB is not sufficient to determine, in combination with the first signal, the spatial position of the terminal device, the control circuitry is configured to control the transmitter circuitry to transmit the second signal to the infrastructure equipment of the wireless telecommunications network.

11. The terminal device of claim 10, wherein the control circuitry is configured to determine whether the information comprised within the second SIB is sufficient to determine, in combination with the first signal, the spatial position of the terminal device based on one of a system value tag of the second SIB, a validity area of the information comprised within the second SIB and a validity time of the information comprised within the second SIB.

12. A mobile station for use in a wireless telecommunications network, the mobile station comprising:
circuitry configured to:
receive a satellite signal transmitted from a Global Navigation Satellite System (GNSS) satellite;

receive information comprised within a first system information block (SIB) transmitted by infrastructure equipment of the wireless telecommunications network;

determine whether the information comprised within the first SIB is sufficient to determine, in combination with the satellite signal, a spatial position of the mobile station;

transmit, when it is determined that the information comprised within the first SIB is not sufficient to determine, in combination with the satellite signal, the spatial position of the mobile station, an on-demand system information (SI) request to the infrastructure equipment of the wireless telecommunications network;

receive positioning assistance information from the infrastructure equipment in response to the on demand SI request, wherein the positioning assistance data is included in a second SIB transmitted by the infrastructure equipment and indicates a spatial position of the GNSS satellite; and determine the spatial position of the mobile station based on the positioning assistance information and the satellite signal received from the GNSS satellite.

13. The mobile station of claim 12, wherein
the circuity is configured to receive a plurality of satellite signals from a plurality of GNSS satellites located at different spatial positions,
the positioning assistance information indicates a spatial position of the plurality of GNSS satellites, and
the circuitry is configured to determine the spatial position of the mobile station based on the positioning assistance information and the plurality of satellite signals received from the plurality of GNSS satellites.

14. The mobile station of claim 13, wherein
each of the plurality of GNSS satellites is Located at a respective predetermined position within a predetermined geographical space.

15. The mobile station of claim 13, wherein
the control circuitry is configured to determine the spatial position of the mobile station with respect to each of the GNSS satellites based on a measurement characteristic of the plurality of satellite signals.

* * * * *